(12) United States Patent
Siegel

(10) Patent No.: US 11,221,138 B1
(45) Date of Patent: Jan. 11, 2022

(54) SYSTEM AND METHOD FOR REMOTE MONITORING AND CONTROL OF LANDFILL AND RECYCLING OPERATIONS

(71) Applicant: WM INTELLECTUAL PROPERTY HOLDINGS, L.L.C., Houston, TX (US)

(72) Inventor: Dennis Craig Siegel, Pleasant, PA (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 17/330,255

(22) Filed: May 25, 2021

Related U.S. Application Data

(60) Provisional application No. 63/030,170, filed on May 26, 2020.

(51) Int. Cl.
| | | |
|---|---|---|
| *F23G 7/08* | (2006.01) | |
| *G05B 1/00* | (2006.01) | |
| *G05B 11/06* | (2006.01) | |
| *G05B 19/048* | (2006.01) | |
| *G06Q 10/00* | (2012.01) | |

(Continued)

(52) U.S. Cl.
CPC ................. *F23G 7/08* (2013.01); *F23G 5/50* (2013.01); *G05B 1/00* (2013.01); *G05B 11/06* (2013.01); *G05B 19/048* (2013.01); *G05D 7/0623* (2013.01); *G06Q 10/30* (2013.01); *F23G 2207/101* (2013.01); *F23G 2207/102* (2013.01); *F23G 2207/112* (2013.01);
(Continued)

(58) Field of Classification Search
CPC ........ F23G 7/08; F23G 5/50; F23G 2207/101; F23G 2207/102; F23G 2207/112; F23G 2207/20; F23G 2209/14; G05B 1/00; G05B 11/06; G05B 19/048; G05B 2219/41108; G05D 7/0623; G06Q 10/30
See application file for complete search history.

(56) References Cited

U.S. PATENT DOCUMENTS

| | | | | |
|---|---|---|---|---|
| 5,842,357 | A * | 12/1998 | Siwajek | C01B 32/50 |
| | | | | 62/625 |
| 6,999,883 | B1 * | 2/2006 | Brady | E21B 43/12 |
| | | | | 702/50 |

(Continued)

FOREIGN PATENT DOCUMENTS

| | | |
|---|---|---|
| CN | 106559799 | 4/2017 |
| CN | 108871873 | 11/2019 |

OTHER PUBLICATIONS

Humoreanu, Bogdan et al.; Wastewater Treatment Plant SCADA Application; 2014.

(Continued)

*Primary Examiner* — David J Laux
(74) *Attorney, Agent, or Firm* — Greenberg Traurig LLP

(57) ABSTRACT

A system and method for remote monitoring and control of landfill and recycling operations provide an intelligent centralized platform for remote, real-time industrial data gathering and process control for management of landfill and recycling operations such as leachate, gas, water and other liquids. The system and method can directly upload machine data (such as liquid volumes, flows, level, equipment runtime, sorter data, status, etc) into a centralized platform. This data can be used for analytics and automation of processes and equipment control.

2 Claims, 41 Drawing Sheets

(51) Int. Cl.
*G05D 7/06* (2006.01)
*F23G 5/50* (2006.01)

(52) U.S. Cl.
CPC ...... *F23G 2207/20* (2013.01); *F23G 2209/14* (2013.01); *G05B 2219/41108* (2013.01)

(56) References Cited

U.S. PATENT DOCUMENTS

| | | | |
|---|---|---|---|
| 7,972,082 B2 * | 7/2011 | Augenstein | B09B 1/006 |
| | | | 405/129.95 |
| 8,594,851 B1 | 11/2013 | Smaidris | |
| 9,062,536 B2 * | 6/2015 | Fischer | B09B 1/006 |
| 9,435,782 B2 | 9/2016 | Lenz et al. | |
| 10,029,290 B2 * | 7/2018 | Campanella | G01N 33/0047 |
| 10,029,291 B2 * | 7/2018 | Fischer | E21B 43/12 |
| 10,041,672 B2 | 8/2018 | Zhdaneev | |
| 10,190,392 B1 | 1/2019 | Bachus et al. | |
| 10,576,515 B2 * | 3/2020 | Campanella | E21B 43/00 |
| 10,850,314 B2 * | 12/2020 | Chambers | G01N 33/225 |
| 10,851,627 B2 * | 12/2020 | Hale | B09B 1/00 |
| 10,882,086 B2 * | 1/2021 | Quigley | B09B 1/006 |
| 10,946,420 B2 * | 3/2021 | Quigley | B09B 1/00 |
| 2001/0005812 A1 * | 6/2001 | Brookshire | B09B 1/00 |
| | | | 702/6 |
| 2008/0127726 A1 * | 6/2008 | Elkins | E21B 47/00 |
| | | | 73/152.42 |
| 2014/0182846 A1 * | 7/2014 | Fischer | B09B 3/0016 |
| | | | 166/250.15 |
| 2017/0218730 A1 * | 8/2017 | Campanella | E21B 43/00 |
| 2017/0218732 A1 * | 8/2017 | Campanella | E21B 43/12 |
| 2019/0232346 A1 | 8/2019 | Speer et al. | |

OTHER PUBLICATIONS

OMNI; Remote Monitoring for Landfill Pump and Flare Station; Feb. 2020; 5 pages.

Epifanev, K. et al.; Problems and Advantages of SCADA Systems When Performoing Measurements of Hazardous Production Technologies; Apr. 1, 2020; Journal of Physics: Conference Series; 8 pages.

* cited by examiner

SYSTEM AND METHOD FOR REMOTE MONITORING AND CONTROL OF LANDFILL AND RECYCLING OPERATIONS

RELATED APPLICATIONS

This application claims the benefit, and priority benefit, of U.S. Provisional Patent Application Ser. No. 63/030,170, filed May 26, 2020, the disclosure and contents of which are incorporated by reference herein in their entirety.

BACKGROUND

Field of Invention

The presently disclosed subject matter relates generally to industrial process control, and more specifically to remote monitoring and control of landfill and recycling operations.

Description of the Related Art

Landfill and recycling facilities can utilize various types of equipment such as pumps, flares, sorters, recycling sorting robots, and balers. Prior systems and methods for data collection and analysis from equipment in these facilities have been inefficient and time-consuming. Improvements to this field of technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a system for remote monitoring and control of flare activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of temperature data, gas pressure data, gas vacuum data, gas flow data, blower motor current, vacuum target setpoint and gas flow target setpoint; a flare control valve or blower speed that is connected to a flare gas supply from the landfill and is operable to regulate the amount of flare gas delivered to the flare; and a monitoring component for: comparing the obtained landfill activity real-time data with pre-stored information from a database, and analyzing the difference between the obtained landfill activity real-time data and the stored information to identify whether the landfill activity has surpassed a pre-set threshold value, wherein the pre-set threshold value is based on one or more of gas pressure/vacuum, gas flow, and flare temperature, and displaying the analysis results on the display, and automatically sending a control signal to the flare control valve or blower speed to increase or decrease the amount of flare gas provided to the flare based on the results of the analysis of the landfill activity real-time data.

In certain illustrative embodiments, a method for remotely monitoring and controlling flare activity in a landfill facility for disposal of waste materials is provided. The method can include causing flare gas from the landfill facility to engage a flare control valve or blower speed that is automatically operable and capable of supplying flare gas to the flare; obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature; and automatically operating the flare control valve or blower speed by the processor sending a control signal to the flare control valve to increase or decrease the amount of flare gas supplied to the flare, based on the results of the analysis of the landfill activity data.

In certain illustrative embodiments, a system for remote monitoring and control of flare activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of temperature data, gas pressure data, gas vacuum data, gas flow data, blower motor current, vacuum target setpoint and gas flow target setpoint; a flare control valve or blower that is connected to a flare gas supply from the landfill and is operable to regulate the amount of flare gas delivered to the flare; and a monitoring component for: comparing the obtained landfill activity real-time data with pre-stored information from a database, and analyzing the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature, and displaying the analysis results as an alarm on the display, and receiving instructions from the user to send a control signal to the flare control valve to increase or decrease the amount of flare gas provided to the flare, based on a determination made by the user after reviewing the results of the analysis of the landfill activity data.

In certain illustrative embodiments, method for remotely monitoring and controlling flare activity in a landfill facility for disposal of waste materials is provided. The method can include: causing flare gas from the landfill facility to engage a flare control valve or blower speed that is automatically operable and supplies flare gas to the flare; obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature; displaying the analysis results as an alarm on a display for a user; and receiving instructions from the user regarding automatically operating the flare control valve, by sending a control signal to the flare control valve to increase or decrease the amount of flare gas supplied to the flare, based on a determination made by the user after reviewing the results of the analysis of the landfill activity data.

In certain illustrative embodiments, a system for remote monitoring and control of air compressor activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of storage liquid level data, air compressor pressure data, air compressor temperature data, pump status data, pump current data, and force main and air supply pressure data; an air compressor that is connected to control valve is operable to regulate the amount of liquid within a landfill cell, tank, gas well or lift-station; and a monitoring component for: comparing the obtained landfill activity real-time data with pre-stored information from a database, and analyzing the difference between the obtained landfill activity real-time data and the stored information to identify whether the landfill activity has surpassed a pre-set threshold value, wherein the pre-set threshold value is based on at least one of landfill liquid levels, volumes, disposal volume and storage capacity; displaying the analysis results on the display; and automatically sending a control signal to the pumps of control valves to increase or decrease the amount of liquid provided to disposal or storage based on the results of the analysis of the landfill activity real-time data.

In certain illustrative embodiments, a method for remotely monitoring and controlling air compressor activity in a landfill facility for disposal of waste materials is provided. The method can include an air compressor that is connected to a control valve is operable to regulate the amount of liquid within a landfill cell, tank, gas well or lift-station, and: obtaining, by at least one reader device located within the landfill facility, specific real-time data relating to landfill activity comprising at least one of storage liquid level data, air compressor pressure data, air compressor temperature data, pump status data, pump current data, and force main and air supply pressure data; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; and automatically operating the control valve, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of air compressor activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of storage liquid level data, air compressor pressure data, air compressor temperature data, pump status data, pump current data, and force main and air supply pressure data; an air compressor that is connected to a control valve is operable to regulate the amount of liquid within a landfill cell, gas well, tank or lift-station; and a monitoring component for: comparing the obtained landfill activity real-time data with pre-stored information from a database; analyzing the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; displaying the analysis results as an alarm on the display; and receiving instructions from the user to send a control signal to the control valve or pump to increase or decrease the amount of liquid within a landfill cell, gas well, tank or lift-station, based on a determination made by the user after reviewing the results of the analysis of the landfill activity data.

In certain illustrative embodiments, a method for remotely monitoring and controlling air compressors in a landfill facility for disposal of waste materials is provided. The method can include: an air compressor that is connected to control valve is operable to regulate the amount of liquid within a landfill cell, gas well, tank or lift-station, and: obtaining, by at least one reader device located within the landfill facility, specific real-time data relating to landfill activity comprising at least one of storage liquid level data, air compressor pressure data, air compressor temperature data, pump status data, pump current data, and force main and air supply pressure data; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; displaying the analysis results as an alarm on a display for a user; and receiving instructions from the user regarding automatically operating the control valve by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of liquid storage tanks activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of liquid level data, liquid flow data, liquid volume data, pump status data, pump current data, pump setpoints, force main and air supply pressure data; a liquid storage tank that is connected to a landfill pump station, gas well or lift station is operable to regulate the amount of liquid within a landfill cell, tank, gas well or lift-station; and a monitoring component for: comparing the obtained landfill activity real-time data with pre-stored information from a database, and analyzing the difference between the obtained landfill activity real-time data and the stored information to identify whether the landfill activity has surpassed a pre-set threshold value, wherein the pre-set threshold value is based on at least one of landfill liquid levels, volumes, disposal volume and storage capacity; displaying the analysis results on the display; and automatically sending a control signal to the Storage level or pumps to increase or decrease the amount of liquid provided to disposal or storage based on the results of the analysis of the landfill activity real-time data.

In certain illustrative embodiments, a method for remotely monitoring and controlling liquid storage tanks activity in a landfill facility for disposal of waste materials is provided. The method can include: a storage tank level or pumps that is connected to a landfill pump station, gas well or lift station is operable to regulate the amount of liquid within a landfill cell, tank, gas well or lift-station, and: obtaining, by at least one reader device located within the landfill facility, specific real-time data relating to landfill activity comprising at least one of liquid level data, liquid flow data, liquid volume data, pump status data, pump current data, pump setpoints, force main and air supply pressure data; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; and automatically operating the storage tank level or pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of storage tanks activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of liquid level data, liquid flow data, liquid volume data, pump status data, pump current data, pump setpoints, force main and air supply pressure data; a storage tank level or pump that is connected to a landfill pump station, gas well or lift station is operable to regulate the amount of liquid within a landfill cell, gas well, tank or lift-station; and a monitoring component for: comparing the obtained landfill activity real-time data with pre-stored information from a database; analyzing the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; displaying the analysis results as an alarm on the display; and receiving instructions from the user to send a control signal to the storage tank level or pump to increase or decrease the amount of liquid within a landfill cell, gas well, tank or lift-station, based on a determination made by the user after reviewing the results of the analysis of the landfill activity data.

In certain illustrative embodiments, a method for remotely monitoring and controlling storage tanks in a landfill facility for disposal of waste materials is provided. The method can include: a storage tank level or pump that is connected to a landfill pump station, gas well or lift station is operable to regulate the amount of liquid within a landfill cell, gas well, tank or lift-station, and: obtaining, by at least one reader device located within the landfill facility, specific real-time data relating to landfill activity comprising at least one of liquid level data, liquid flow data, liquid volume data, pump status data, pump current data, pump setpoints, force main and air supply pressure data; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes, disposal volume and storage capacity; displaying the analysis results as an alarm on a display for a user; and receiving instructions from the user regarding automatically operating the storage tank level or pump by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of condensate sumps activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of liquid level data, liquid flow data, liquid volume data, pump status data, pump current data, pump setpoints, force main and air supply pressure data and pump pulses or strokes data; a condensate pump that is connected to a landfill sump, gas well or liquid storage tank is operable to regulate the amount of liquid within a landfill cell, tank, gas well or lift-station; and a monitoring component for: comparing the obtained landfill activity real-time data with pre-stored information from a database; analyzing the difference between the obtained landfill activity real-time data and the stored information to identify whether the landfill activity has surpassed a pre-set threshold value, wherein the pre-set threshold value is based on at least one of landfill liquid levels, volumes and storage capacity; displaying the analysis results on the display; and automatically sending a control signal to the condensate pumps to increase or decrease the amount of liquid provided to disposal or storage based on the results of the analysis of the landfill activity real-time data.

In certain illustrative embodiments, a method for remotely monitoring and controlling condensate pump activity in a landfill facility for disposal of waste materials is provided. The method can include: a condensate pump that is connected to a landfill sump, gas well or liquid storage tank is operable to regulate the amount of liquid within a landfill cell, tank, gas well or lift-station, and: obtaining, by at least one reader device located within the landfill facility, specific real-time data relating to landfill activity comprising at least one of liquid level data, liquid flow data, liquid volume data, pump status data, pump current data, pump setpoints, force main and air supply pressure data and pump pulses or strokes data; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; and automatically operating the condensate pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of condensate pumps activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of liquid level data, liquid flow data, liquid volume data, pump status data, pump current data, pump setpoints, force main and air supply pressure data and pump pulses or strokes data; a landfill pump that is connected to a landfill sump, gas well or liquid storage tank is operable to regulate the amount of liquid within a landfill cell, tank or lift-station; and a monitoring component for: comparing the obtained landfill activity real-time data with pre-stored information from a database; analyzing the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on the display; and receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling condensate pumps in a landfill facility for disposal of waste materials is provided. The method can include: a condensate pump that is connected to a landfill sump, gas well or liquid storage tank is operable to regulate the amount of liquid within a landfill cell, tank or lift-station, and: obtaining, by at least one reader device located within the landfill facility, specific real-time data relating to landfill activity comprising at least one of liquid level data, liquid flow data, liquid volume data, pump status data, pump current data, pump setpoints, force main pressure data and pump runtime data; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on a display for a user; and receiving instructions from the user regarding automatically operating the condensate pumps by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of pump station activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of liquid level data, liquid flow data, liquid volume data, pump status data, pump current data, pump setpoints, force main and air supply pressure data and pump pulses or strokes data; a landfill pump that is connected to a landfill sump, gas well or liquid storage tank is operable to regulate the amount of liquid within a landfill cell, tank, gas well or lift-station; and a monitoring component for: comparing the obtained landfill activity real-time data with pre-stored information from a database; analyzing the difference between the obtained landfill activity real-time data and the stored information to identify whether the landfill activity has surpassed a pre-set threshold value, wherein the pre-set threshold value is based on at least one of landfill liquid levels, volumes and storage capacity; displaying the analysis results on the display; and automatically sending a control signal to the landfill pumps to increase or decrease the amount of liquid provided to disposal or storage based on the results of the analysis of the landfill activity real-time data.

In certain illustrative embodiments, a method for remotely monitoring and controlling liquid pump stations activity in a landfill facility for disposal of waste materials is provided. The method can include: a landfill pump that is connected to a landfill sump, gas well or liquid storage tank is operable to regulate the amount of liquid within a landfill cell, tank, gas well or lift-station, and: obtaining, by at least one reader device located within the landfill facility, specific real-time data relating to landfill activity comprising at least one of liquid level data, liquid flow data, liquid volume data, pump status data, pump current data, pump setpoints, force main and air supply pressure data and pump pulses or strokes data; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; and automatically operating the landfill pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of liquid pump stations activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of liquid level data, liquid flow data, liquid volume data, pump status data, pump current data, pump setpoints, force main and air supply pressure data and pump pulses or strokes data; a landfill pump that is connected to a landfill sump, gas well or liquid storage tank is operable to regulate the amount of liquid within a landfill cell, tank or lift-station; and a monitoring component for: comparing the obtained landfill activity real-time data with pre-stored information from a database; analyzing the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on the display; and receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling liquid pump stations in a landfill facility for disposal of waste materials is provided. The method can include: a landfill pump that is connected to a landfill sump, gas well or liquid storage tank is operable to regulate the amount of liquid within a landfill cell, tank or lift-station, and: obtaining, by at least one reader device located within the landfill facility, specific real-time data relating to landfill activity comprising at least one of liquid level data, liquid flow data, liquid volume data, pump status data, pump current data, pump setpoints, force main pressure data and pump runtime data; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on a display for a user; and receiving instructions from the user regarding automatically operating the landfill pumps by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of pump station activity in a landfill facility for disposal of waste materials is provided. The system can include: a memory; a display for viewing by a user; a processor coupled to the memory programmed with executable instructions, the instructions including a landfill data interface for obtaining specific real-time data relating to landfill activity comprising at least one of liquid level data, liquid flow data, liquid volume data, pump status data, pump current data, pump setpoints, force main pressure data and pump runtime data; a landfill pump that is connected to a landfill sump or liquid storage tank is operable to regulate the amount of liquid within a landfill cell, tank or lift-station; and a monitoring component for: comparing the obtained landfill activity real-time data with pre-stored information from a database; analyzing the difference between the obtained landfill activity real-time data and the stored information to identify whether the landfill activity has surpassed a pre-set threshold value, wherein the pre-set threshold value is based on at least one of landfill liquid levels, volumes and storage capacity; displaying the analysis results on the display; and automatically sending a control signal to the landfill pumps to increase or decrease the amount of liquid provided to disposal or storage based on the results of the analysis of the landfill activity real-time data.

In certain illustrative embodiments, a method for remotely monitoring and controlling liquid pump stations activity in a landfill facility for disposal of waste materials is provided. The method can include: a landfill pump that is connected to a landfill sump or liquid storage tank is operable to regulate the amount of liquid within a landfill cell, tank or lift-station, and: obtaining, by at least one reader device located within the landfill facility, specific real-time data relating to landfill activity comprising at least one of liquid level data, liquid flow data, liquid volume data, pump status data, pump current data, pump setpoints, force main pressure data and pump runtime data; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; and automatically operating the landfill pumps, by the processor sending a control signal to the pumps to increase or decrease the amount of liquid within a landfill cell, tank or lift-station; based on the results of the analysis of the landfill activity data.

In certain illustrative embodiments, a system for remote monitoring and control of liquid pump stations activity in a landfill facility for disposal of waste materials is provided. The system can include: a memory; a display for viewing by a user; a processor coupled to the memory programmed with executable instructions, the instructions including a landfill interface for obtaining specific real-time data relating to landfill activity comprising at least one of liquid level data, liquid flow data, liquid volume data, pump status data, pump current data, pump setpoints, force main pressure data and pump runtime data; a landfill pump that is connected to a landfill sump or liquid storage tank is operable to regulate the amount of liquid within a landfill cell, tank or lift-station; and a monitoring component for: comparing the obtained landfill activity real-time data with pre-stored information from a database; analyzing the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on the display; and receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling liquid pump stations in a landfill facility for disposal of waste materials is provided. The method can include: a landfill pump that is connected to a landfill sump or liquid storage tank is operable to regulate the amount of liquid within a landfill cell, tank or lift-station, and: obtaining, by at least one reader device located within the landfill facility, specific real-time data relating to landfill activity comprising at least one of liquid level data, liquid flow data, liquid volume data, pump status data, pump current data, pump setpoints, force main pressure data and pump runtime data; comparing the obtained landfill activity real-time data with pre-stored information from a database; analyzing, by a processor, the difference between the obtained landfill activity real-time data and the pre-stored information to identify whether the landfill activity has surpassed a pre-set threshold value, wherein the pre-set threshold value is based on at least one of landfill liquid levels, volumes and storage capacity; displaying the analysis results as an alarm on a display for a user; and receiving instructions from the user regarding automatically operating the landfill pumps by sending a control signal to the flare control valve to increase or decrease the amount of liquid within a landfill cell, tank or lift-station, based on a determination made by the user after reviewing the results of the analysis of the landfill activity data.

BRIEF DESCRIPTION OF THE DRAWINGS

A better understanding of the presently disclosed subject matter can be obtained when the detailed description is considered in conjunction with the following drawings, wherein:

FIG. 17 is a flare settings popup window in accordance with an illustrative embodiment of the presently disclosed subject matter.

FIG. 23 is a level settings popup window in accordance with an illustrative embodiment of the presently disclosed subject matter.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to industrial process control, and more particularly to a system and method for remote monitoring and control of landfill and recycling operations.

In certain illustrative embodiments, the presently disclosed system and method provide an intelligent centralized platform for remote, real-time industrial data gathering and process control for management of landfill and recycling operations such as leachate, gas, water and other liquids. The system and method can directly upload machine data (such as liquid volumes, flows, level, equipment runtime, sorter data, status, etc) into a centralized platform. This data can be used for analytics and automation of processes and equipment control.

In certain illustrative embodiments, landfill wastewater and flare equipment is connected to a supervisory control and data acquisition ("SCADA") platform that is capable of allowing remote control of equipment. The platform can automatically monitor the health of the landfill water and gas environmental operational technology, which can include: one or more of: (i) automatically sending control signals to pumps and blowers to adjust equipment speeds and status based on active liquid storage levels; (ii) automatically convert landfill pump and gas collected data into web-based dashboards and reports; (iii) provide alarms via SMS, email and voice calls; and (iv) provide remote web-based operations of landfill environmental operational technology.

In certain illustrative embodiments, remotely controlled operations can include: one or more of: (i) remote control of the on/off setpoints for the pumps at a pumping location; (ii) remote control of the resetting alarms or alerts; (iii) collection of pump motor runtime and amount of pump starts; (iv) providing the remote users the option to adjust pumping levels and enable or disable alarms without the need for any type of programming; and (iv) providing the remote users the ability to adjust alarm thresholds thus giving each alarm a pipeline action.

Figure 1:
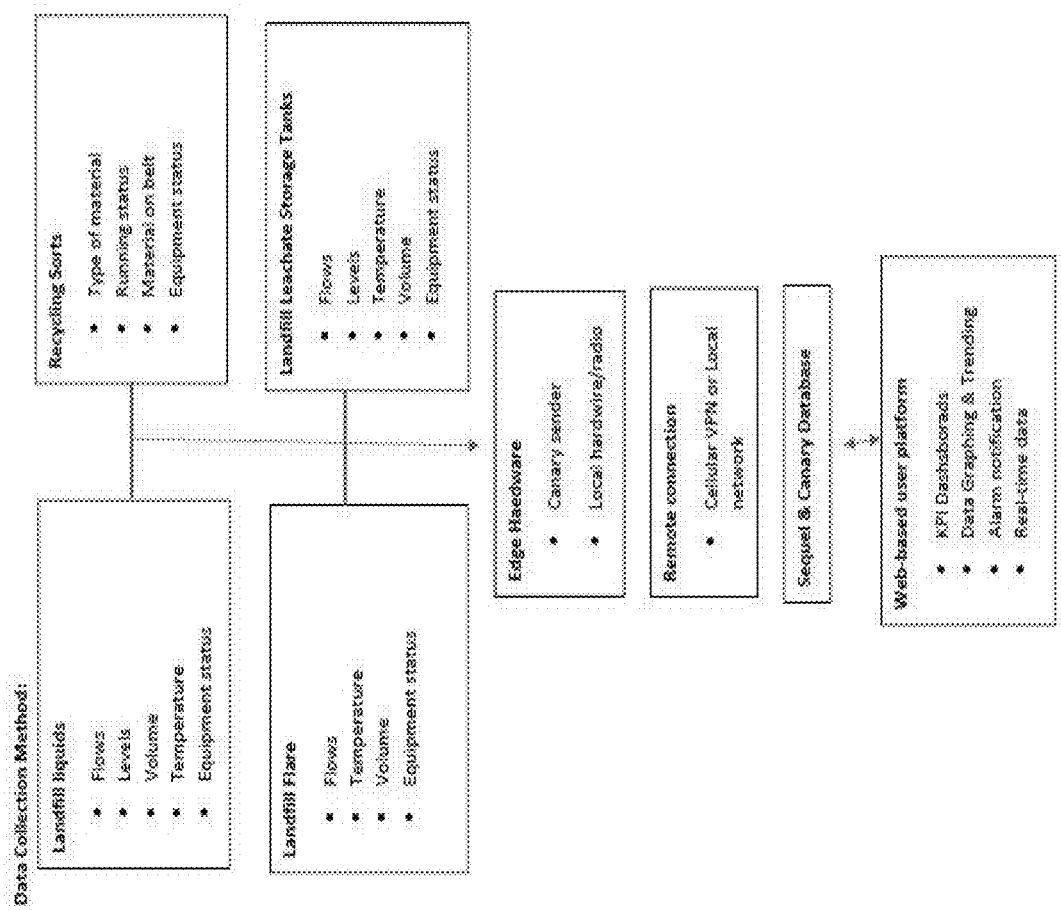
FIG. 1 is a flow chart showing means for data collection in accordance with an illustrative embodiment of the presently disclosed subject matter.

As illustrated in FIG. 1, the presently disclosed system and method can utilize various data collection means for gathering and displaying of machine data from landfill and recycling equipment such as pumps, flares, sorters, recycling sorting robots, and balers. Machine data based on key performance indicators can automatically be collected from the field equipment and stored onto databases where data is compiled and analysis is performed on a digital platform. The digital platform can be web-based and supply end-users with an interface to allow interaction with the data from field equipment. The platform can also be mobile responsive and automatically generate key performance indicators of the landfill and recycling equipment based on data queries. The platform can automatically collect data remotely like pump runtime and current and number of starts, and then compare the data to other data such as liquid flows, volumes, and levels. A SCADA system can be utilized that analyzes the data, makes determinations based on the data, and then allows remote control of landfill and recycling equipment such as pumps, flares, sorters, robots and balers.

In certain illustrative embodiments, the presently disclosed system and method can involve a database query. The database query can be automated to provide a quick reference to the field equipment specialized for landfill equipment such as pumping and landfill gas flare applications. Pump KPI dashboards are developed to provide insight into the equipment's real-time and historical data. This system automates the following data gathering and visualization, which is typically not done by landfill or recycling operations. If operations is performing these data gathering and visualization, it is typically completed manually which is inefficient and prone to error.

Figure 2:
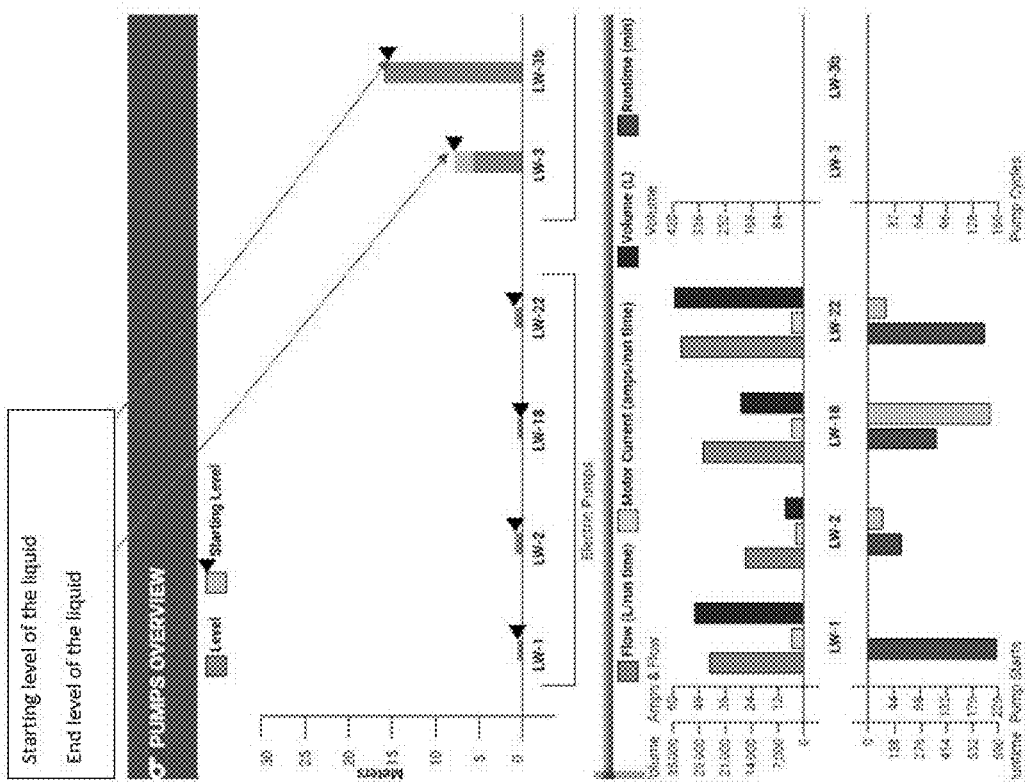
FIG. 2 is a screen shot of a display screen in accordance with an illustrative embodiment of the presently disclosed subject matter.

A representative screen shot of a display screen is shown in FIG. 2, according to certain illustrative embodiments. The screen is divided between two central panels with similar functionality, as both contain a bar chart and a time-series chart. The time-scale for the charts in both groups can be adjusted using the Start and End date and time selectors in the top-right corner of the screen.

The top panel provides a level analysis of the pumps. The bar chart shows the level of each pump at the start and end times selected. The bottom panel shows data for the flow, motor current, volume, runtime, and the number of starts or pump cycles for each pump as a bar chart. Providing a date selection (Day and Time) to start and end the pump query. Pump liquid flow (LPM and GPM) are divided by the pump runtime. Pump current (amps) is divided by the pump runtime. Liquid levels are displayed based on a "Start" day and time.

In certain illustrative embodiments, the system gathers alarms and alerts from landfill equipment such as pumps, flares, storage tanks, and recycling equipment such as sorters and balers. The SCADA system collects these alarms and they are stored onto the database. From the Dashboards submenu, the Alarm Analysis screen shows aggregated details about alarms triggered during a specific time-frame. At the top of the screen there are two date and time selectors used to select the start and end times of the time-frame to analyze. Next to the selectors, dropdown lists are used to filter alarm results by priority, asset group, or by a specific asset. A numeric text field is used to specify the total number of alarm results to analyze. This number will only affect the results if there are more alarms in the selected time-frame than the specified number limit. To apply the selected filters, click the refresh arrow to the right of the numeric text field. The results are split into five panels which display the data in different formats: (i) Top Left Panel—Provides the Alarm Key Performance Indicators (KPIs) in a table, including but not limited to total alarms, total duration in an alarm state, and average time to acknowledge and clear; (ii) Top Right Panel—Provides a time-series chart of the number of alarms per hour and the duration they lasted. Hovering the mouse cursor over or tapping on the chart creates guiding lines and labels showing the data values at that place in the chart; (iii) Middle Left and Right Panels—Contain pie charts showing alarm frequency and duration percentages. Hovering the mouse cursor over or tapping the panels of these charts opens a small popup window displaying the name and percentage of the alarm; and (iv) Bottom Panel—Provides a table showing a summary of the alarms by priority. The table can be sorted by clicking on the column headings. Only one column can be used to sort at a time.

Operating the System

Overview

In certain illustrative embodiments, the presently disclosed system and method can utilize a supervisory control and data acquisition ("SCADA") platform with menu based navigation organized by topic to provide quick and easy access to one or more of landfill assets such as operational status, real time and historical asset data, alarms, electronic reporting, a maintenance form, and current weather conditions.

Figure 3:
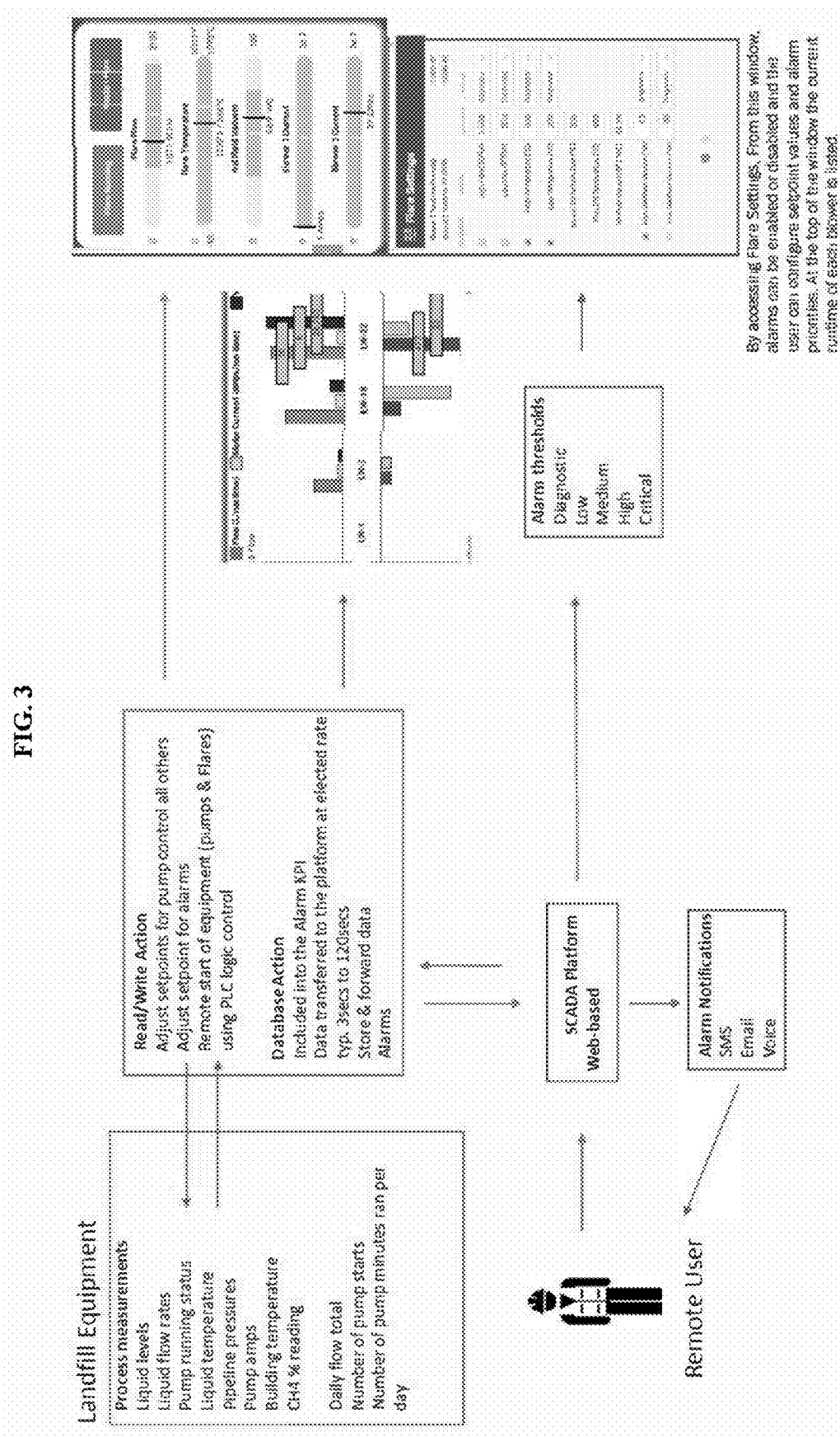
FIG. 3 is a layout of a landfill equipment connectivity and control mechanism in accordance with an illustrative embodiment of the presently disclosed subject matter.
Figure 4:
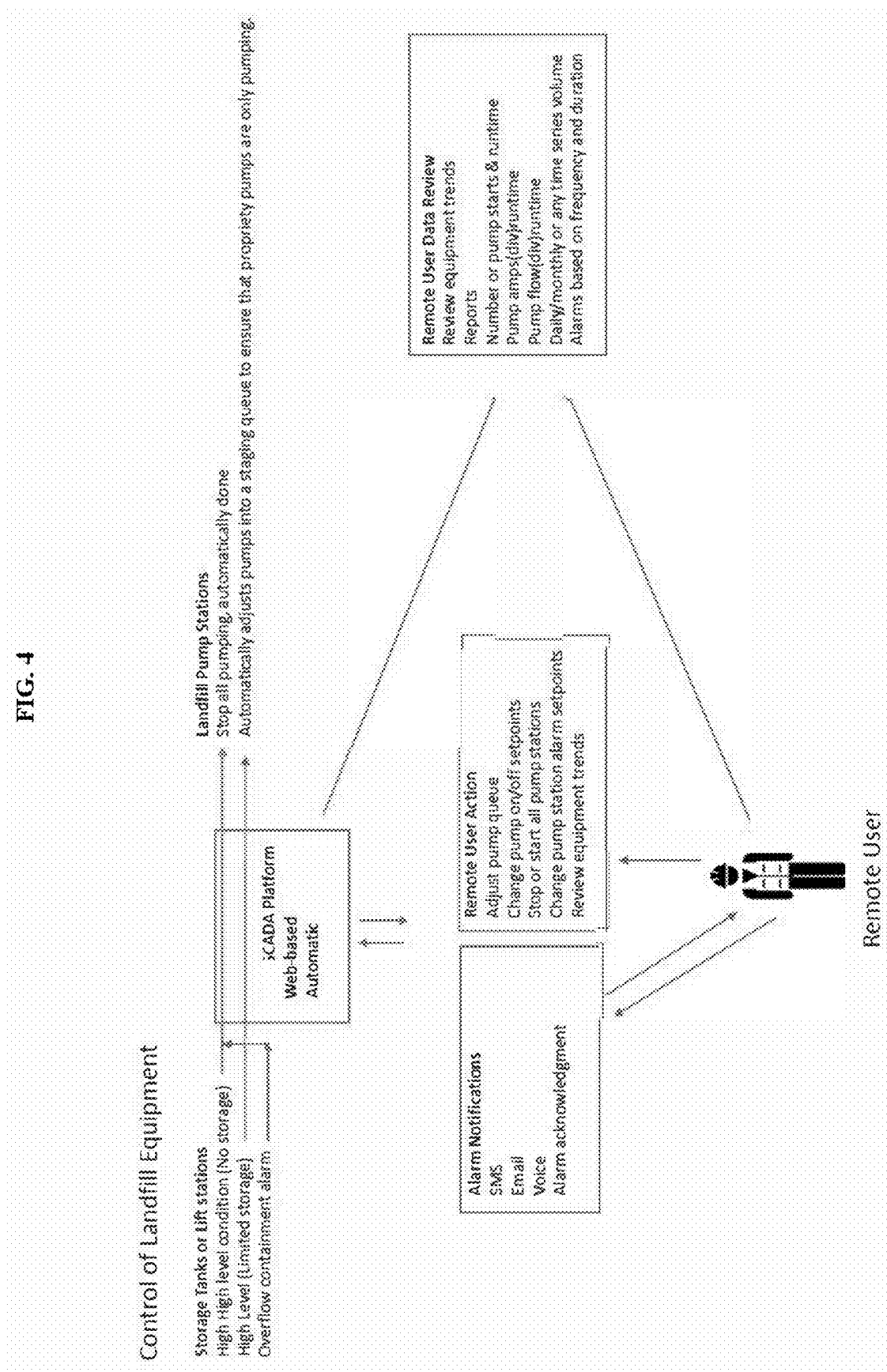
FIG. 4 is a layout of a landfill equipment connectivity and control mechanism in accordance with an illustrative embodiment of the presently disclosed subject matter.

Illustrative embodiments of the landfill equipment connectivity and control mechanisms for the presently disclosed system and method are shown in FIGS. 3 and 4.

Figure 5:
FIG. 5 is a home screen display in accordance with an illustrative embodiment of the presently disclosed subject matter.

An illustrative embodiment of a home screen for the presently disclosed system and method is shown in FIG. 5. On the left side of the screen there is a side navigation bar which is used to navigate the SCADA system. Hovering the mouse over the side navigation bar reveals a chevron button ("<") which can be used to hide the side bar. This button is located off the right side of the bar and is centered vertically. This button can be clicked again to bring the navigation bar back in place, or can be dragged up or down to reposition the button. Some options are hidden within fly-out submenus which open when clicked. Clicking on a menu option which opens a fly-out submenu does not change the screen being viewed.

The Home button on the side navigation bar is the screen that appears when the system is first loaded. This screen can consist of satellite imagery of the landfill site with icons and data labels marking where the different assets are located on the site. An exception is the condensate sumps, which can be found in the bottom right corner of the screen. The data for each asset can be updated in real-time, and clicking or tapping on the data will open the corresponding asset page for a more detailed display. A summary explanation of each asset page can be found in the following sections. To return to the main screen from an asset screen, click on the Home button on the side navigation bar.

In certain illustrative embodiments, the home screen will look different on mobile devices. For example, in some smaller screens, the map is not shown and the data labels are tiled to make review easier.

Assets

Figure 6:
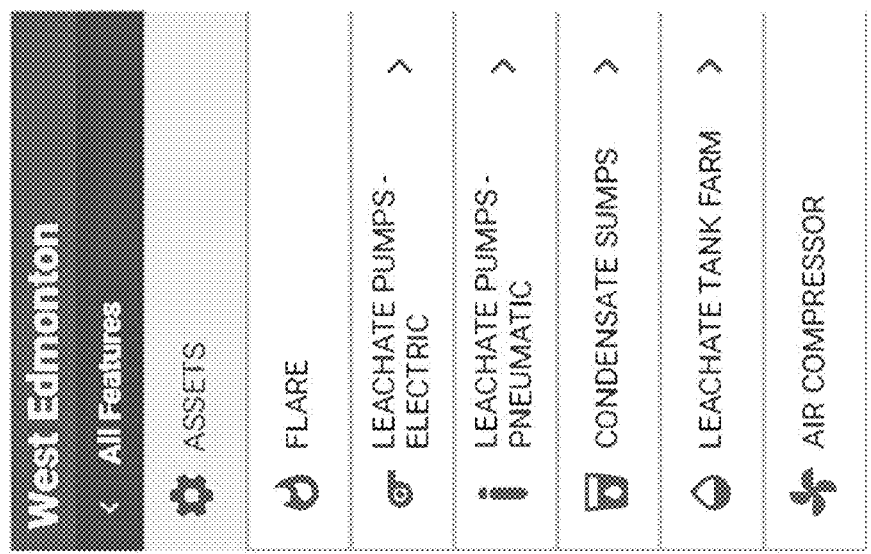
FIG. 6 is an assets header page in accordance with an illustrative embodiment of the presently disclosed subject matter.

An illustrative embodiment of a assets header page for the presently disclosed system and method is shown in FIG. 6. The Assets button on the side navigation bar opens the Assets fly-out submenu. This menu leads to the screens for six different asset types: (1.) Flare, (2.) Leachate Pumps—Electric, (3.) Leachate Pumps—Pneumatic, (4.) Condensate Sumps, (5.) Leachate Tank Farm, and (6.) Air Compressor. Note that three asset types, Leachate Pumps—Electric, Leachate Pumps—Pneumatic, and Condensate Sumps, include a fly-out menu that leads to individual assets screens of that type. The Leachate Tank Farm submenu provides screens that are uniquely configured to display the Leachate Tank Farm assets and data.

Figure 7:
FIG. 7 is an asset screen (i.e., a flare screen) in accordance with an illustrative embodiment of the presently disclosed subject matter.

An illustrative embodiment of an example asset screen (i.e., a Flare screen) for the presently disclosed system and method is shown in FIG. 7. Each asset screen can contains the following common features:

(i) Asset name: each of the individual asset screens have a title header showing the asset name.

(ii) Alarm indicator: located in the upper right hand corner which displays the current number of active unacknowledged alarms for that asset. See Alarms section below for a summary of the Alarms screen which provides an overview of alarms available for each asset. Clicking the alarm indicator shows the alarms for that particular asset. Clicking the Back button returns to the asset screen.

(iii) Network indicator: located in the upper right hand corner displays whether or not the screen is getting live data from the associated asset. Some assets gather data from two or more devices. A Green indicator means all the device connections for that asset are good, Red means none of the device connections for that asset are good, and Yellow means only some of the device connections for that asset are good.

Figure 8:
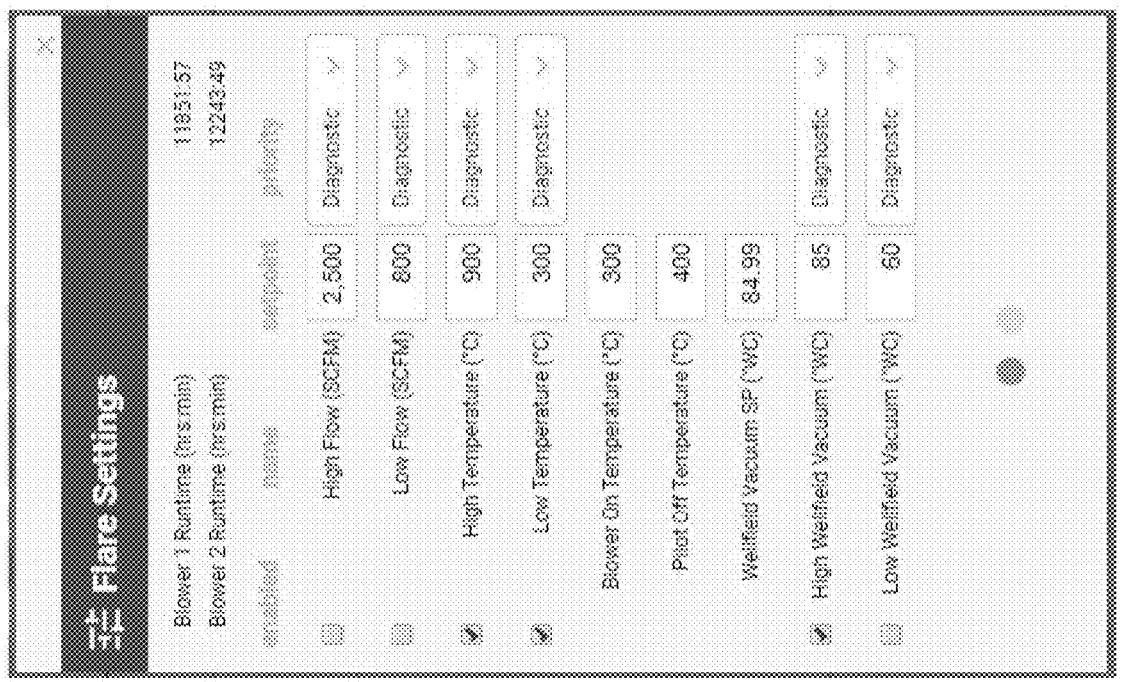
FIG. 8 is a flare settings popup screen in accordance with an illustrative embodiment of the presently disclosed subject matter.

The asset screens other than the Leachate Tank Farm screen, are generally structured the same and include three main panels. The panels function as follows:

(i) Top left panel: presents real-time operating data and in some cases provides buttons to clear alarms or restart equipment. The operating data is presented as light grey horizontal process bars. The process bars each include a black line indicator as well as a label showing the current value. They present the normal expected range for the data as a darker grey field within the light grey bar. Clicking on the process bar will cause a set point popup to appear that displays the set points for that asset. An illustrative embodiment for the presently disclosed system and method is shown in FIG. 8.

(ii) Bottom left panel: with the exception of the Air Compressor Screen, this panel presents the daily flow totals for the past ten days in the form of a bar chart. Each bar is colored green with the date displayed on the left. Hovering the mouse over a bar, or tapping on mobile devices, will create a small popup containing the data value. This popup will disappear when the mouse is moved off the bar or the screen is tapped elsewhere. Please note that the scaling of the bars depends on the largest daily volume.

(iii) Right Panel: presents a time-series charts with trending data customized to the asset type. To change the horizontal time scale, click on one of the time options at the bottom of the page. The time scale of each chart can be individually managed by clicking and dragging the data-series or by using the mouse scroll wheel, and can be reset by clicking the icon that appears in the top right corner of the chart. Hovering the mouse over a chart will create a small popup containing the value and timestamp of that data point. This can be toggled on or off via the Trace option at the bottom of the page. The toggle switch at the bottom of the page is used to change between Real-time and Historical trends. The Real-time trend mode displays data going back in time a set amount from the most recently gathered data, and updates as new data is collected. The Historical trend mode displays the data gathered between two specified points in time, and will not be updated with any new information that is recorded. In Historical mode, clicking the Start or End fields will open a date selector allowing the selection of a date and time to bind the search query.

Screens for the six asset types are discussed below.

Flare

An illustrative embodiment of a flare screen for the presently disclosed system and method is shown in FIG. 7. In addition to the general screen panel functionality described above, the following summarizes the unique features of this flare screen:

In the top left panel, the running indicator uses both text and color to depict if the flare is running: green if running and red if not running. If the flare is running and an operating parameter falls outside of the normal expected range (dark gray bar) the process bar will turn red to indicate an alarm condition. The Restart Flare button allows the user to restart the flare if it is not running, and will open a confirmation popup window when clicked. Please note that the flare should not be restarted remotely unless the user is certain that a remote restart is absolutely needed and that there are no safety or environmental hazards in doing so. Preferably, the flare should not be restarted remotely if it can be restarted in person by local staff.

Clicking on any of the process bars in the top left panel will open a popup window called Flare Settings, as illustrated in FIG. 8. From this window, alarms can be enabled or disabled and the user can configure setpoint values and alarm priorities. At the top of the window the current runtime of each blower is listed. The configuration options are split between two pages which can be navigated by swiping across the window, or by clicking the page dots at the bottom of the window. To close the popup, click the X button in the top right corner.

Leachate Pumps—Electric.

Figure 9:
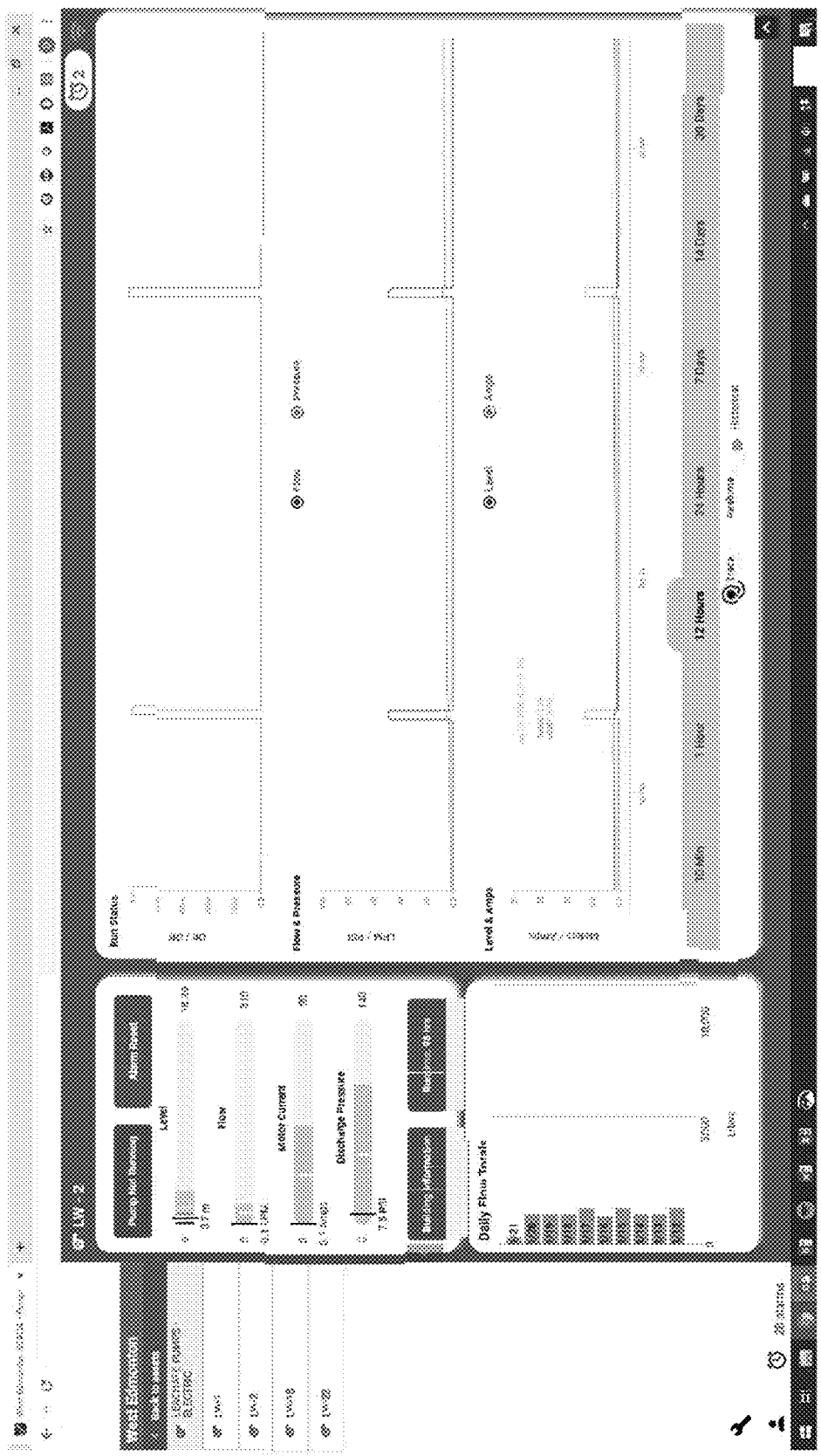
FIG. 9 is a leachate pump—electric screen in accordance with an illustrative embodiment of the presently disclosed subject matter.

An illustrative embodiment of a Leachate Pump—Electric Screen for the presently disclosed system and method is shown in FIG. 9. In addition to general screen panel functionality described above common to the "Leachate Pump—Electric" screen, the following summarizes the unique features of this screen.

In the Top Left Panel, the running indicator uses both text and color to depict if the electric leachate pump is running: green if running and red if not running. The background color of each process bar signifies the alarm status of the value. The normal operating range between the high and low levels remains grey regardless of alarm state. When the value is within the normal operating range, the outer ranges are colored light grey. When the value exceeds the compliance level, the compliance range turns yellow. When the value exceeds the high-high level, the upper range turns red. The lower range turns red when the value drops below the low level, unless the pump is not running, in which case the color will not change and no alarms will be triggered. Additionally, the pump on and pump off setpoints are displayed on the level process bar as a smaller green bar and dark grey bar respectively. The Alarm Reset button allows the user to reset the alarms for the leachate pump, and will open a confirmation popup window when clicked. Please note that there are some alarms that require a local reset button to be pressed and cannot be reset via the Ignition SCADA system.

Figure 10:
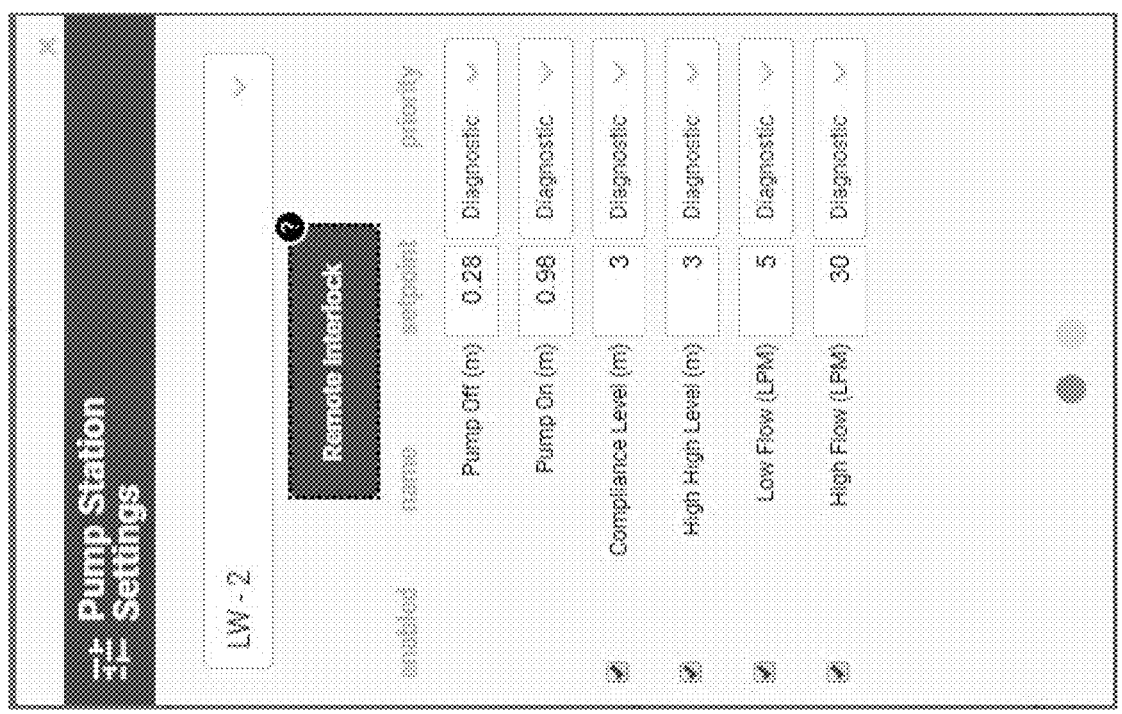
FIG. 10 is a pump station settings popup window in accordance with an illustrative embodiment of the presently disclosed subject matter.

An illustrative embodiment of a Pump Station Settings Popup Window for the presently disclosed system and method is shown in FIG. 10. Clicking on any of the process bars will open the popup window for Pump Station Settings. From this window alarms can be enabled or disabled and the user can configure setpoint values and alarm priorities. At the top of the window a dropdown list can be used to select another pump station to configure. This value will default to whichever pump station page is currently open. The Remote Interlock button shuts down the pump, creates an alarm, and prevents restart of the pump from the Ignition SCADA system. To disable the remote interlock, the pump must be restarted locally at the site. The configuration options are split between two pages which can be navigated by swiping across the window, or by clicking the page dots at the bottom of the window. To close the popup, click the X button in the top right corner.

Figure 11:
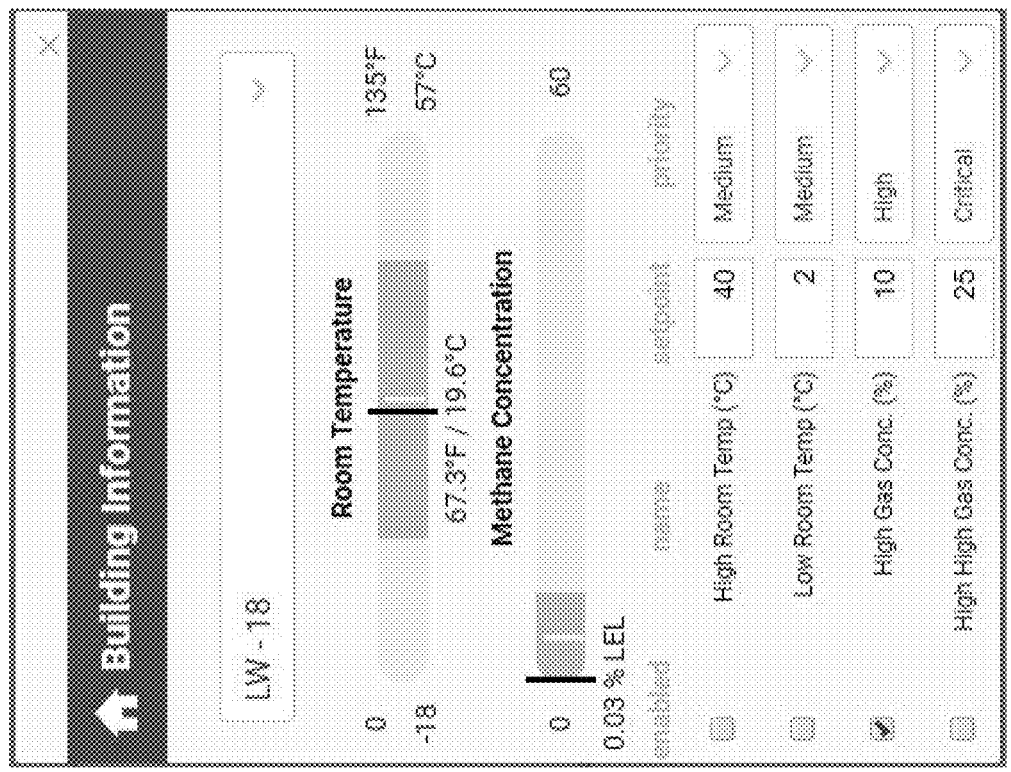
FIG. 11 is a building information popup window in accordance with an illustrative embodiment of the presently disclosed subject matter.

An illustrative embodiment of a Building Information Popup Window for the presently disclosed system and method is shown in FIG. 11. Clicking the Building Information button on the pump station asset screen will open the popup window. From this window, alarms for building temperature and gas levels can be enabled or disabled and the user can configure setpoint values and alarm priorities. At the top of the window a dropdown list is used to select another pump station to configure. In the middle of the window there are two process bars depicting the temperature and methane concentration inside the building. These process bars act the same as the process bars on the pump page.

Figure 12:
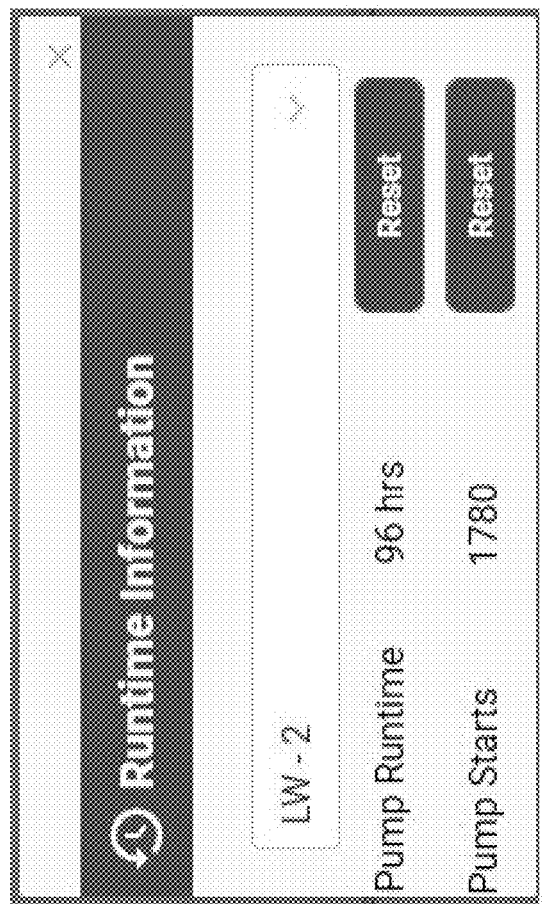
FIG. 12 is a runtime information popup window in accordance with an illustrative embodiment of the presently disclosed subject matter.

An illustrative embodiment of a Runtime Information Popup Window for the presently disclosed system and method is shown in FIG. 12. Clicking the Runtime button on the pump station asset screen will open the popup window called Runtime Information. This window displays the runtime of the current pump and the number of pump starts since the values were last reset. At the top of the window a dropdown list is used to select which pump station you wish to view. Both counters can be reset by clicking the respective Reset buttons, which will open a confirmation popup window when clicked.

Leachate Pumps—Pneumatic Screen.

Figure 13:
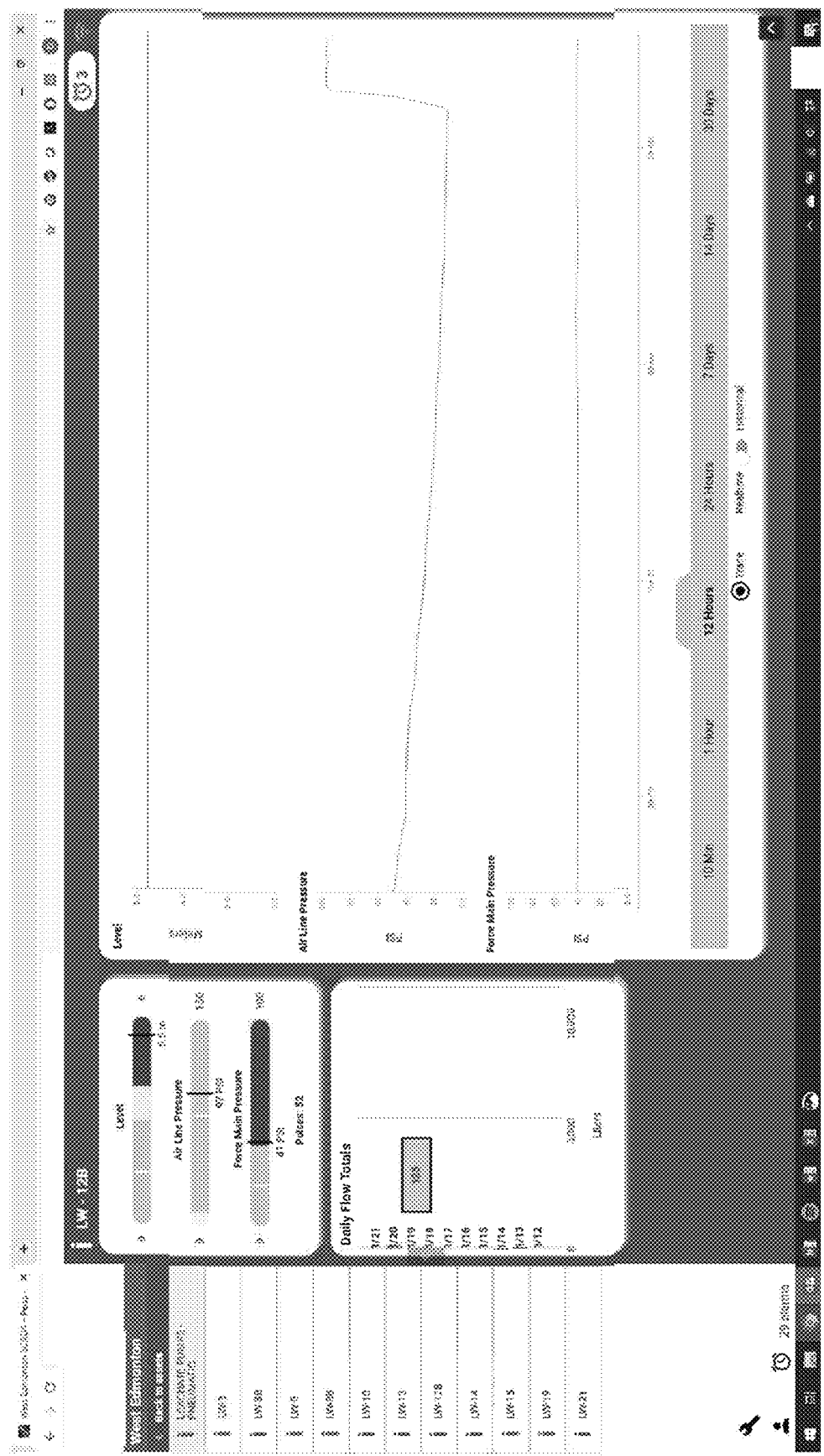
FIG. 13 is a leachate pump—pneumatic screen in accordance with an illustrative embodiment of the presently disclosed subject matter.

An illustrative embodiment of a Leachate Pump—Pneumatic screen for the presently disclosed system and method is shown in FIG. 13. In addition to the general screen panel functionality common to the Leachate Pump—Pneumatic screens, the following summarizes the unique features of these screens.

In the Top Left Panel, the background color of each horizontal process bar signifies the alarm state of the value. The normal operating range between the high and low levels remains grey regardless of alarm state. When the value is within the normal operating range, the outer ranges are colored light grey. When the value exceeds the compliance level, the compliance range turns yellow. When the value exceeds the high-high level, the upper range turns red.

Figure 14:
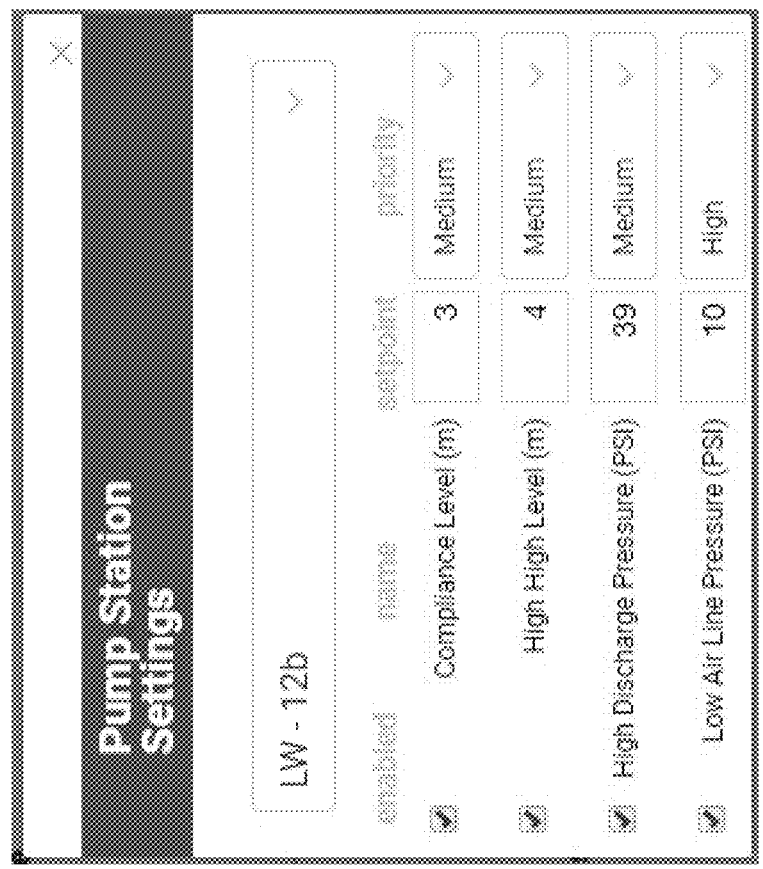
FIG. 14 is a pump station settings popup window in accordance with an illustrative embodiment of the presently disclosed subject matter.

An illustrative embodiment of a Pump Station Settings Popup Window for the presently disclosed system and method is shown in FIG. 14. Clicking on any of the process bars will open the popup window called Pump Station Settings. From this window, alarms can be enabled or disabled and the user can configure setpoint values and alarm priorities. At the top of the window a dropdown list is used to select a leachate pump to configure. To close the popup, click the X button in the top right corner.

Condensate Sumps.

Figure 15:
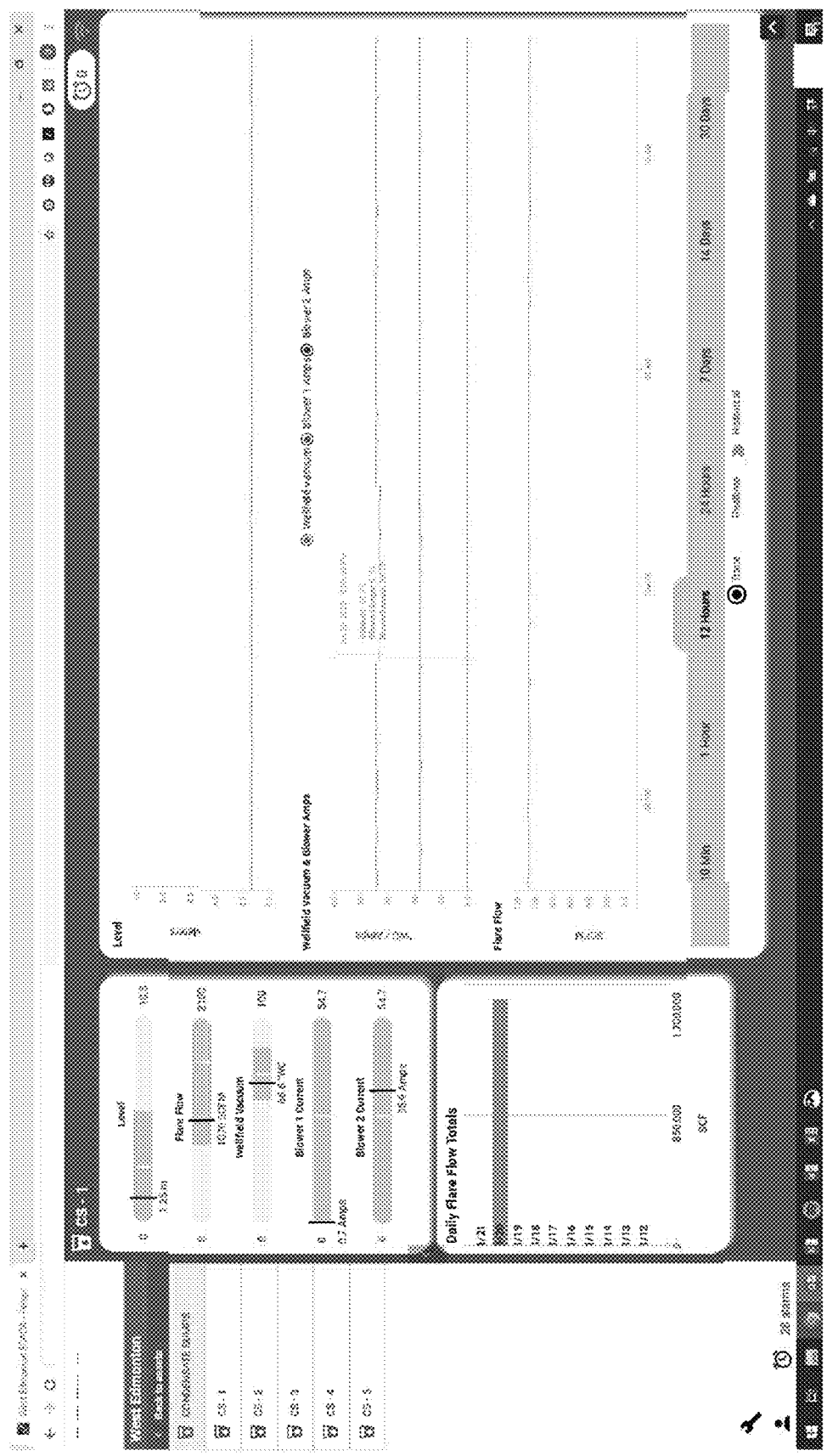
FIG. 15 is a condensate sump screen in accordance with an illustrative embodiment of the presently disclosed subject matter.

An illustrative embodiment of a Condensate Sump Screen for the presently disclosed system and method is shown in FIG. 15. In addition to the general screen panel functionality describe above common to the Condensate Sumps screens, the following summarizes the unique features of this screen.

In the Top Left Panel, the background color of each horizontal process bar signifies the alarm state of the value. The normal operating range between the high and low levels remains grey regardless of alarm state. When the value is within the normal operating range, the outer ranges are colored light grey. When the value exceeds the compliance level, the compliance range turns yellow. When the value exceeds the high-high level, the upper range turns red.

Figure 16:
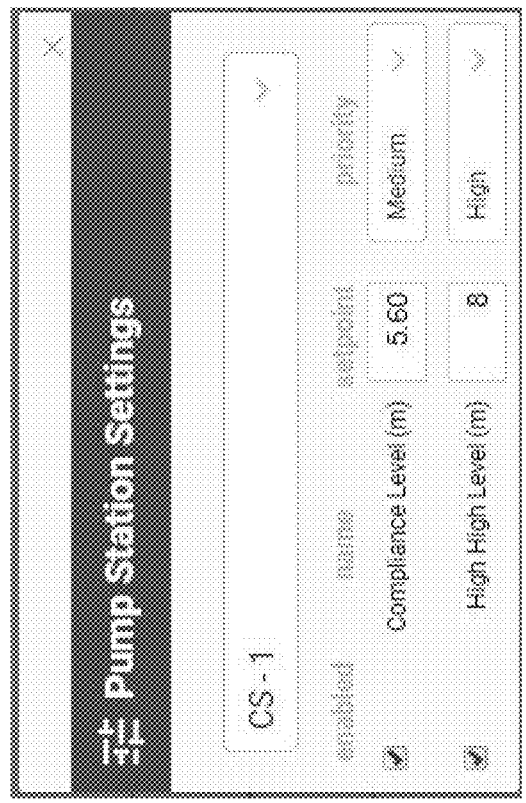
FIG. 16 is a pump station settings popup window in accordance with an illustrative embodiment of the presently disclosed subject matter.

An illustrative embodiment of a Pump Station Settings Popup Window for the presently disclosed system and method is shown in FIG. 16. Clicking on the Level process bar will open the popup window called Pump Station Settings. From this window, alarms can be enabled or disabled and the user can configure setpoint values and alarm priorities. At the top of the window a dropdown list is used to select a condensate sump to configure. To close the popup, click the X button in the top right corner.

Figure 17:
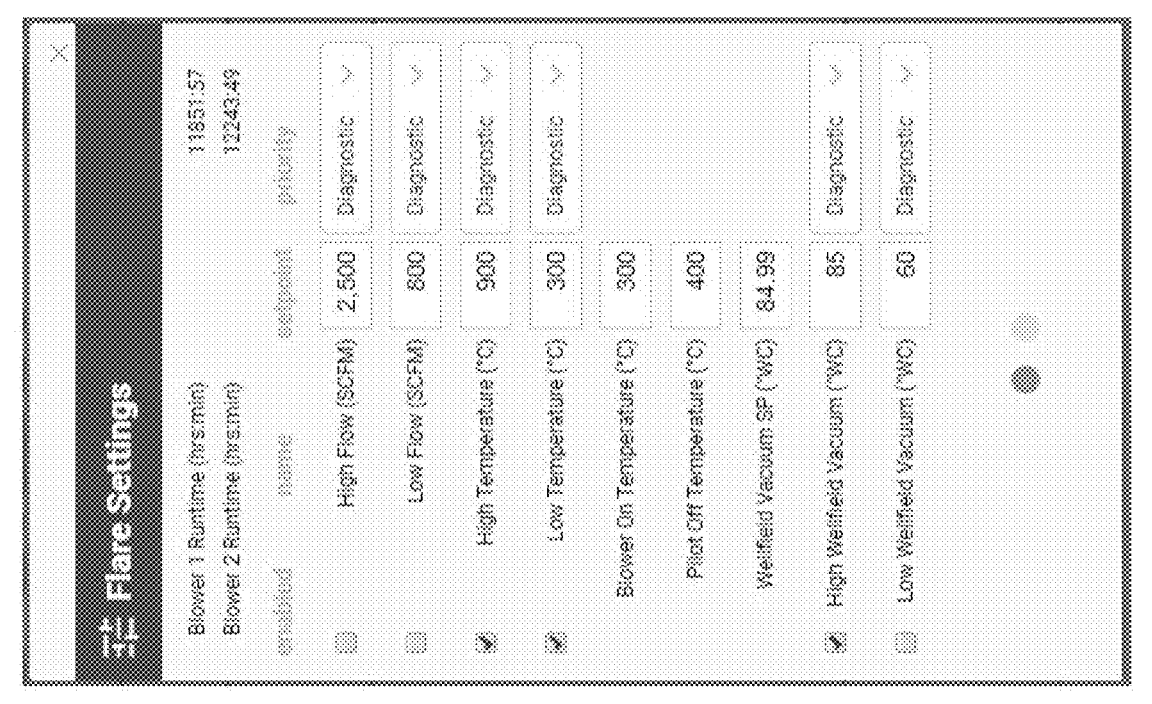

An illustrative embodiment of a Flare Settings Popup Window for the presently disclosed system and method is shown in FIG. 17. Clicking on any of the other process bars will open the popup window called Flare Settings. From this window, flare alarms can be enabled or disabled and the user can configure setpoint values and alarm priorities. At the top of the window the current runtime of each blower is listed. The configuration options are split between two pages which can be navigated by swiping across the window, or by clicking the page dots at the bottom of the window. To close the popup, click the X button in the top right corner.

Leachate Tank Farm—Tank Farm Flows.

Figure 18:
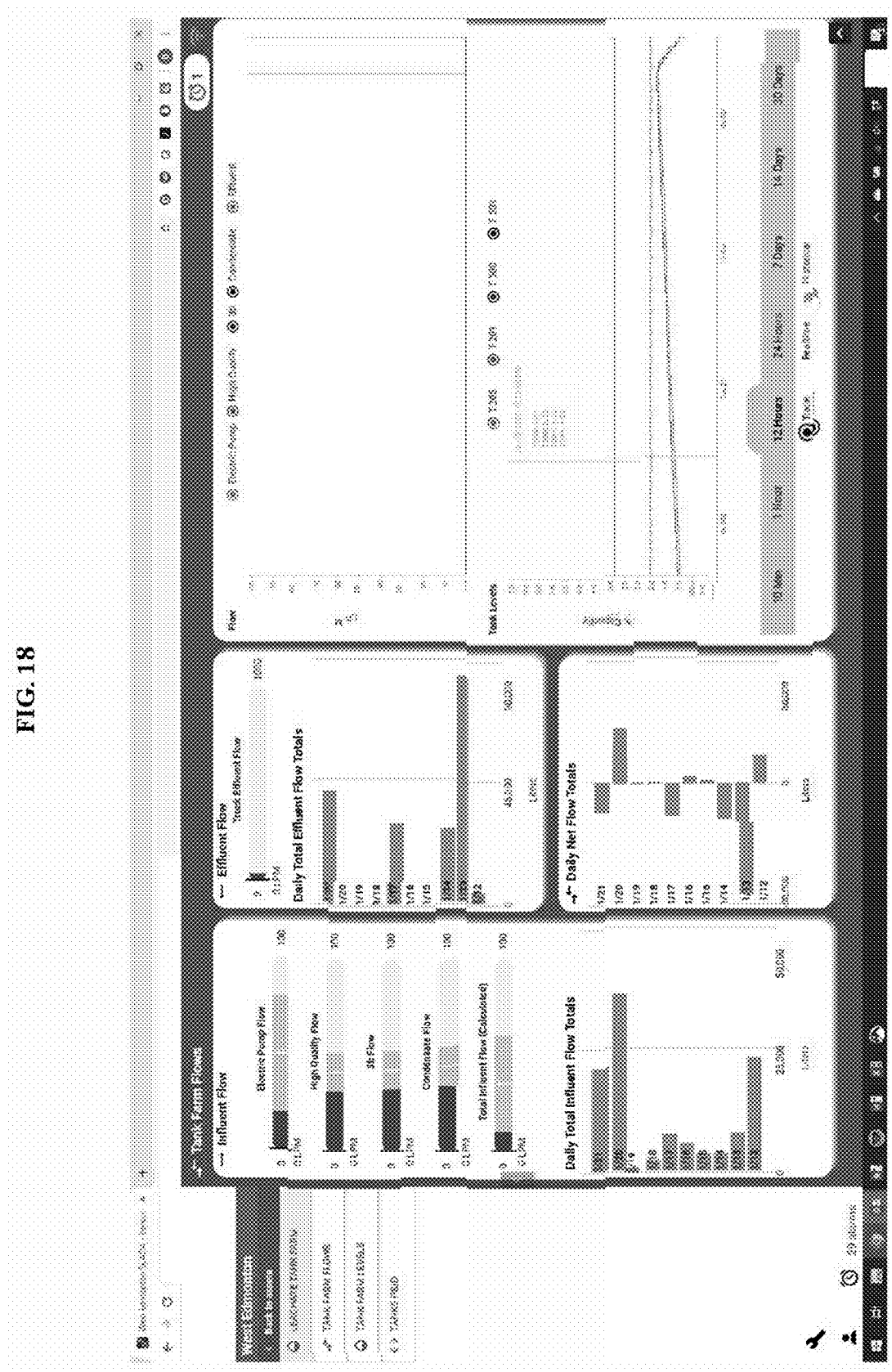
FIG. 18 is a tank farm flows screen in accordance with an illustrative embodiment of the presently disclosed subject matter.

An illustrative embodiment of a Tank Farm Flows Screen for the presently disclosed system and method is shown in FIG. 18. The Tank Farm Flows screen is comprised of four main panels that provide an overview of liquid influent and effluent flows to the Tank Farm. The panels function as follows:

(i) Left Panel—Provides real-time data for the influent flow in the form of process bars and daily influent flow totals in the form of a bar chart. The background color of each bar signifies the alarm state of the flow path. The normal operating range between the high and low levels remains grey regardless of alarm state. When the value is within the normal operating range, the outer ranges are colored light grey. When the value exceeds the high level, the upper range turns red. The bar chart shows the totaled daily flow totals for all flow paths for the past ten days. Each bar is colored green with the date displayed on the left. See FIGS. 19 and 20 for popup windows made available by hovering/clicking on each of the process bars.

(ii) Middle Top Panel—Provides real-time data for the effluent flow in the form of process bars and daily effluent flow totals in the form of a bar chart. This panel has the same functionality as the Left Panel. Clicking on the Truck Effluent Flow process bar will open the Influent/Effluent Flow Settings popup window mentioned in the previous paragraph. See FIG. 21 for popup windows made available by clicking the Effluent Flow process bar.

(iii) Middle Bottom Panel—Provides the daily net flow totals for the past ten days in the form of a bar chart. Each bar is colored green with the date displayed on the left.

(iv) Right Panel—Contains time-series charts with trending data. Both the "Flow" and "Tank Levels" charts contain multiple data sets that can be toggled by clicking the color circle icons in the legend above each chart. To change the amount of time being shown for every chart, click on the time options at the bottom of the page. The time scale of each chart can be individually managed by clicking and dragging the data-series or by using the mouse scroll wheel, and can be reset by clicking the icon that appears in the top right corner of the chart. Hovering the mouse over a chart will create a small popup containing the value and timestamp of that data point. This can be toggled on or off via the "Trace" option at the bottom of the page. The toggle switch at the bottom of the page is used to change between "Real-time" and "Historical" trends. The "Real-time" trend mode displays data going back in time a set amount from the most recently gathered data, and updates as new data is collected. The "Historical" trend mode displays the data gathered between two specified points in time, and will not be updated with any new information that is recorded. In "Historical" mode, clicking the "Start" or "End" fields will open a date selector allowing the selection of a date and time to bind the search query.

Figure 19:
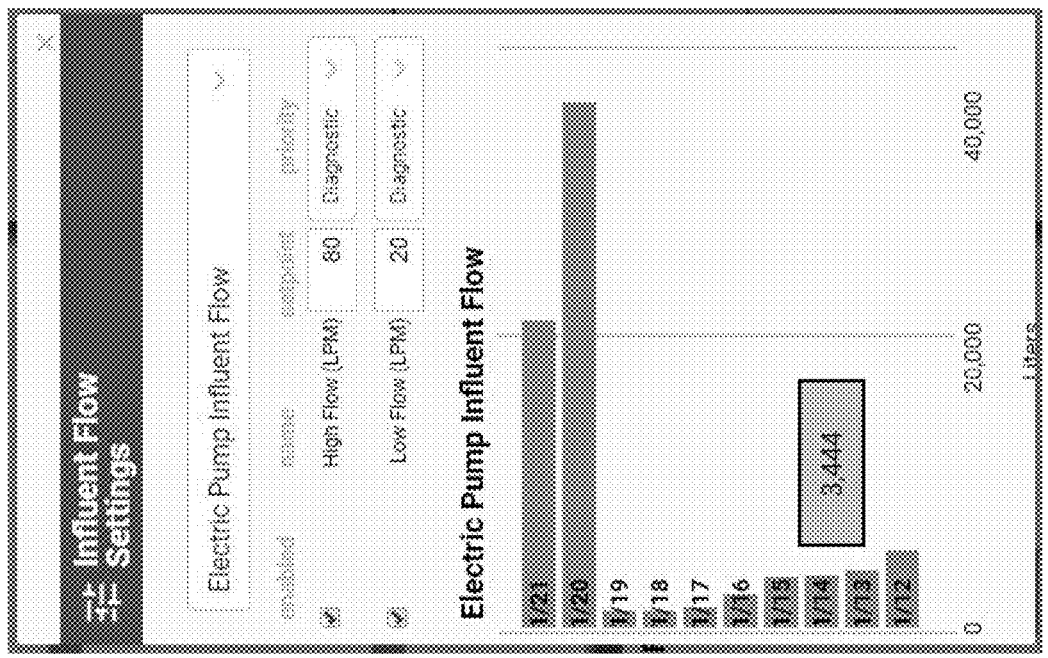
FIG. 19 is an influent flow settings popup window in accordance with an illustrative embodiment of the presently disclosed subject matter.

Clicking on any of the first four process bars will open a popup window called Influent Flow Settings, see FIG. 19. From this window, alarms can be enabled or disabled and the user can configure setpoint values and alarm priorities. At the top of the window a dropdown list is used to select which flow path to configure. Below the configuration menus, a bar chart is used to show the flow totals for the past ten days for the flow path selected. This bar chart has the same functionality as the bar charts on the Tank Farm page. To close the popup, click the X button in the top right corner.

Figure 20:
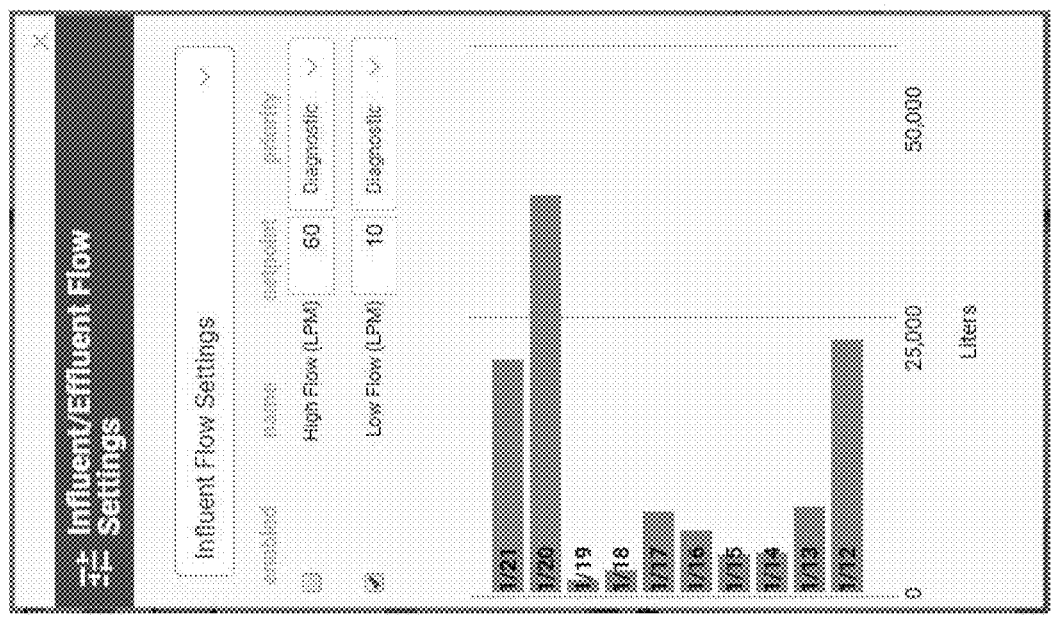
FIG. 20 is an influent/effluent flow settings popup window in accordance with an illustrative embodiment of the presently disclosed subject matter.

Clicking on the Total Influent Flow process bar will open a popup window called Influent/Effluent Flow Settings, see FIG. 20. From this window, alarms can be enabled or disabled and the user can configure setpoint values and alarm priorities. At the top of the window a dropdown list is used to select either the influent or effluent flow settings to configure. To close the popup, click the X button in the top right corner.

Figure 21:
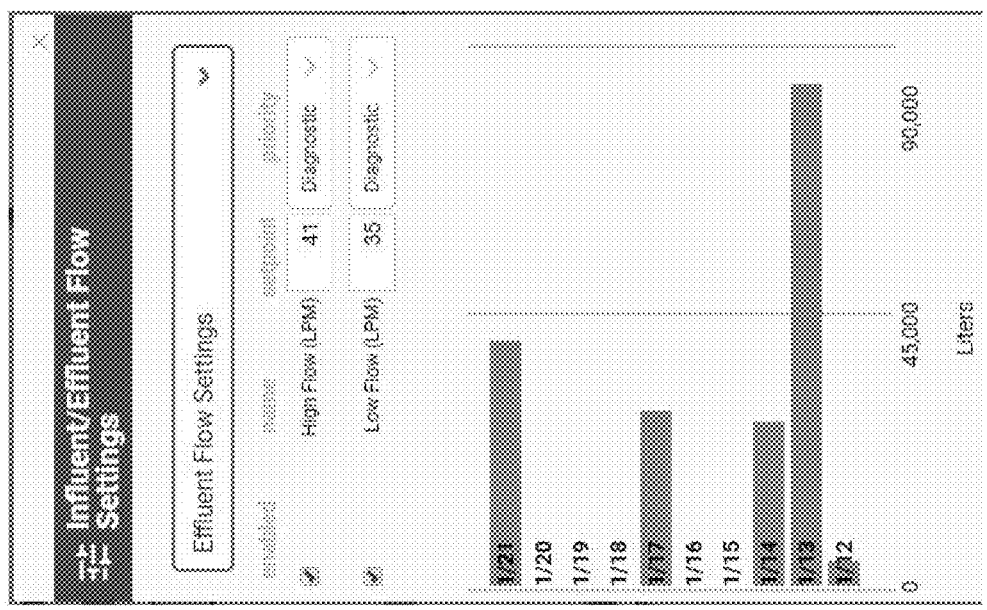
FIG. 21 is an influent/effluent flow settings popup window in accordance with an illustrative embodiment of the presently disclosed subject matter.

Clicking on the Effluent Flow process bar will open a popup window called Influent/Effluent Flow Settings, see FIG. 21. From this window, alarms can be enabled or disabled and the user can configure setpoint values and alarm priorities. At the top of the window a dropdown list is used to select either the influent or effluent flow settings to configure. To close the popup, click the X button in the top right corner.

Leachate Tank Farm—Liquid Levels.

Figure 22:
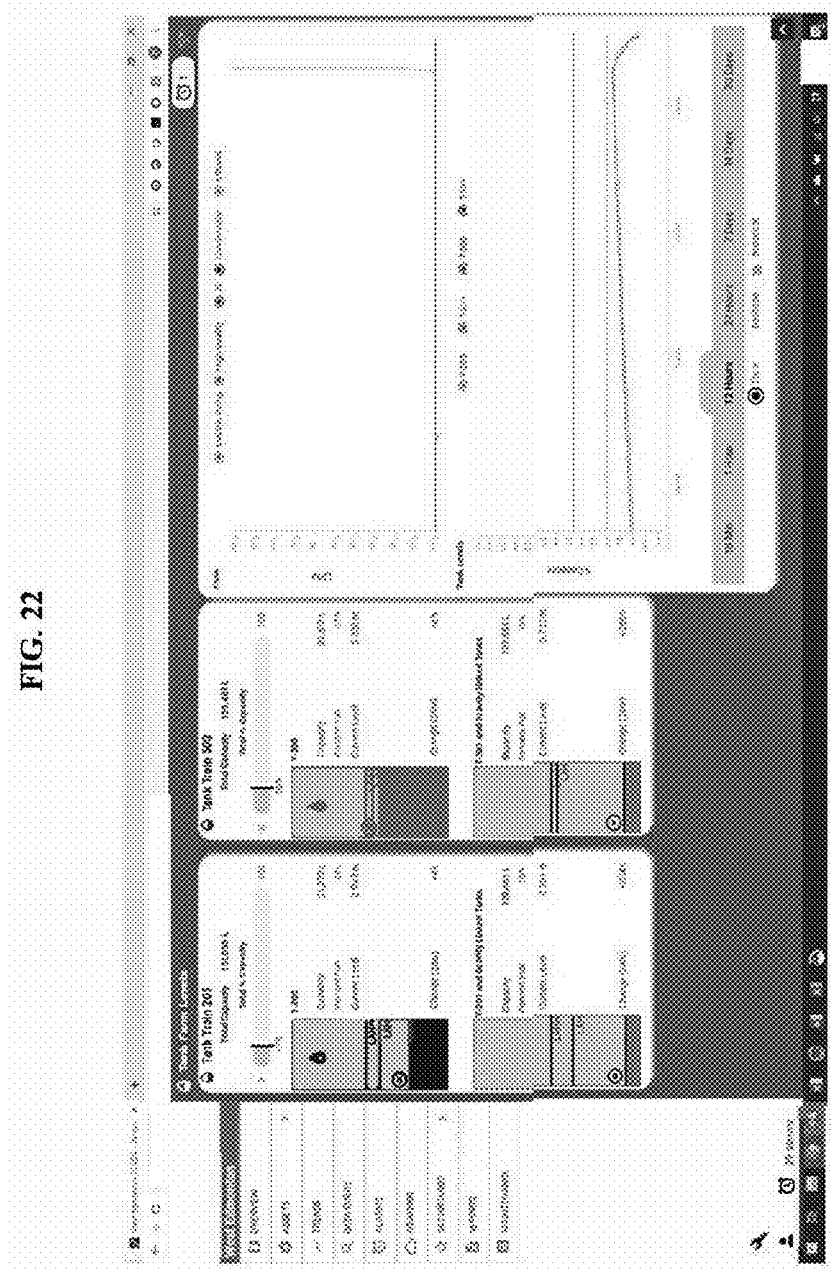
FIG. 22 is a tank farm levels screen in accordance with an illustrative embodiment of the presently disclosed subject matter.

An illustrative embodiment of a Tank Farm Levels Screen for the presently disclosed system and method is shown in FIG. 22. The Tank Farm Levels screen is comprised of three main panels that provide an overview of liquid levels within specified leachate tanks. The panels function as follows:

(i) Left and Middle Panels—Provide real-time capacity data for the storage tank trains (Tank Trains 205 and 500, respectively), and have the same functionality. At the top of each panel is a label with the estimated total tank train capacity and a process bar showing the estimated filled percentage of the tank train. Below the process bar are tank graphics which include a black line indicator as well as a legend showing the data values and units. The background color of each tank signifies the alarm state of the tank. The space above the filled area is colored grey. When the value is within the high and low levels, the filled area is colored blue. If the value is between the high and high-high levels, the filled area is colored yellow. When the value exceeds the high-high level or is lower than the low level, the filled area turns red. There are line indicators for the different alarms. LAHH stands for Level Alarm High-High, LAH stands for Level Alarm High, and LAL stands for Level Alarm Low. The raindrop icon represents the location of the float switch in the tank, and the chevron or equals sign show the level trend of that tank for the past 24 hours. See FIG. 23 for the "Level Settings" popup window made available by clicking on each of the tank icons.

(ii) Right Panel—Provides time-series charts with trending data. Both the Flow and Tank Levels charts contain multiple data sets that can be toggled by clicking the color circle icons in the legend above each chart. To change the amount of time being shown for every chart, click on the time options at the bottom of the page. The time scale of each chart can be individually managed by clicking and dragging the data-series or by using the mouse scroll wheel, and can be reset by clicking the icon that appears in the top right corner of the chart. Hovering the mouse over a chart will create a small popup containing the value and timestamp of that data point. This can be toggled on or off via the Trace option at the bottom of the page. The toggle switch at the bottom of the page can is used to change between Real-time and Historical trends. The Real-time trend mode displays data going back in time a set amount from the most recently gathered data, and updates as new data is collected. The Historical trend mode displays the data gathered between two specified points in time, and will not be updated with any new information that is recorded. In Historical mode, clicking the Start or End fields will open a date selector allowing the selection of a date and time to bind the search query.

Figure 23:
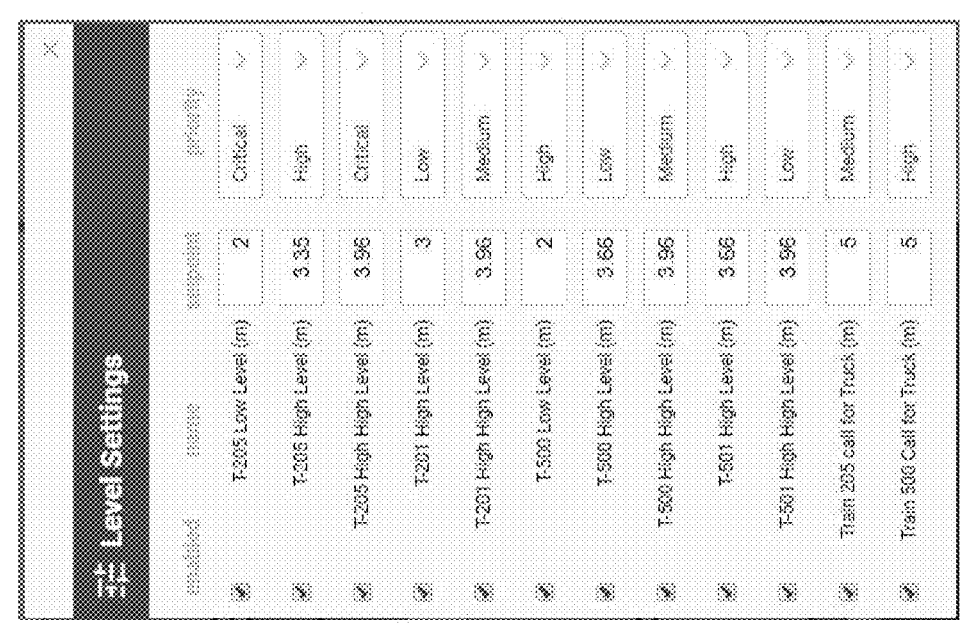

Clicking on any of the tank graphics will open a popup window called Level Settings, see FIG. 23. From this window, alarms can be enabled or disabled and the user can configure setpoint values and alarm priorities for all of the tanks. The last two items, Call for Truck, are used to configure when the system sends a notification letting the recipient know that the tank train needs to be emptied. To close the popup, click the X button in the top right corner.

Leachate Tank Farm—P&ID

Figure 24:
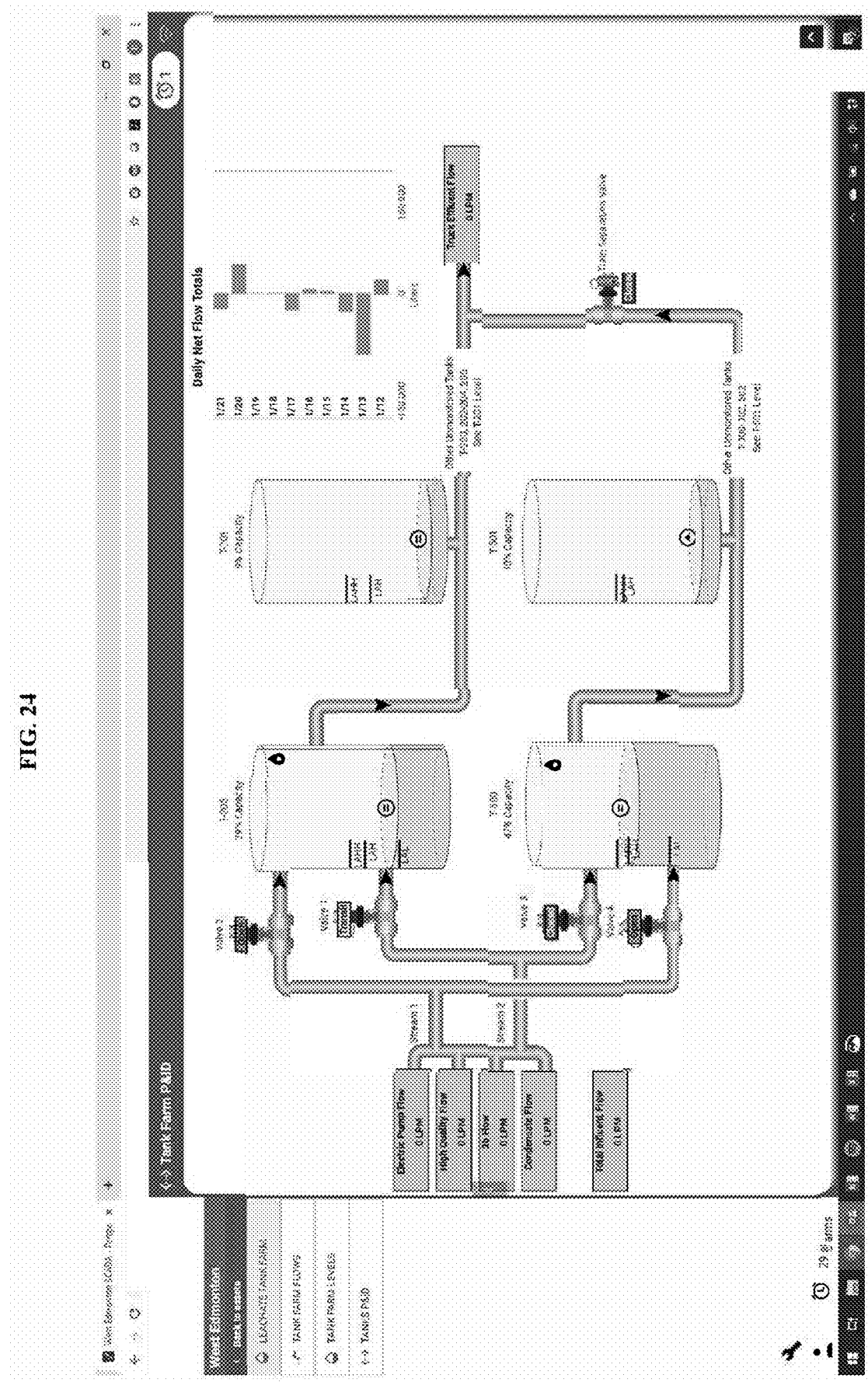
FIG. 24 is a tank farm P&ID screen in accordance with an illustrative embodiment of the presently disclosed subject matter.

From within the Assets submenu, selecting Leachate Tank Farm will open another submenu listing each of the screens for the Tank Farm. An illustrative embodiment of a Tank Farm P&ID Screen for the presently disclosed system and method is shown in FIG. 24. The Tank Farm P&ID screen shows the graphical representation of the Tank Farm system. The influent and effluent flow labels and values are linked to the same controls as the Tank Farm Flows screen described above. Clicking on any of the four influent flow labels opens the Influent Flow Settings popup window described above. Clicking on either the Total Influent Flow or the Truck Effluent Flow labels opens the Influent/Effluent Flow Settings popup window described above.

Daily Net Flow Totals bar chart described above is in the top right corner of this screen as well. The tanks in the middle of the screen represent the same data as the tanks on the Tank Farm Levels screen described above. Clicking on any of the tanks opens the Level Settings popup window described above. Tanks T-201 and T-501 are representative of all other gravity-fed tanks in their respective tank train. The arrows on the pipes indicate the flow direction through the pipe.

Figure 25:
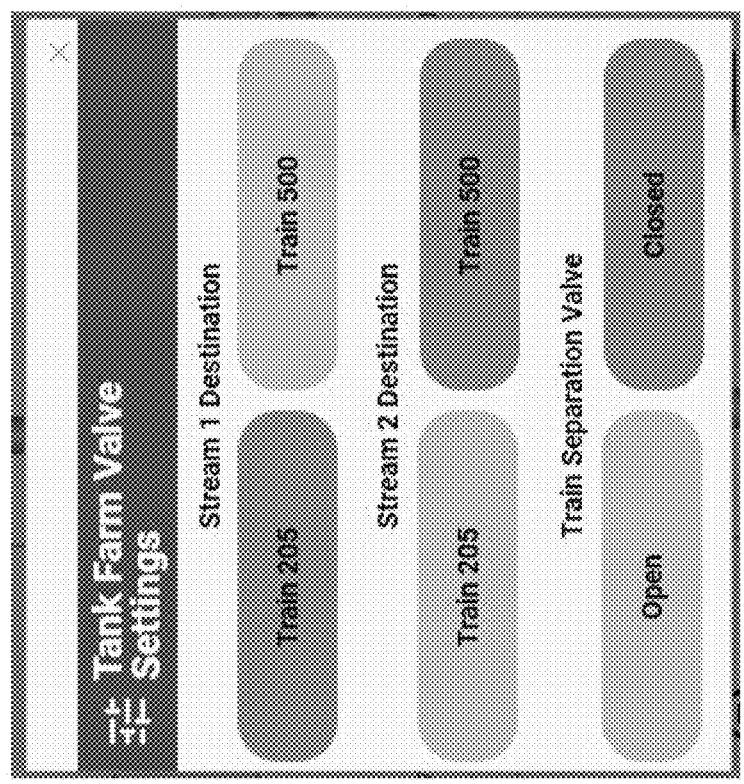
FIG. 25 is a tank farm valve settings popup window in accordance with an illustrative embodiment of the presently disclosed subject matter.

An illustrative embodiment of a Tank Farm Valve Settings Popup Window for the presently disclosed system and method is shown in FIG. 25. Clicking on any of the valve graphics will open the popup window called Tank Farm Valve Settings. This window is used to configure the destination of each stream. To close the popup, click the X button in the top right corner. It is not recommended to change the valve settings remotely as there are manual valves that need to be adjusted in conjunction with the automatic valves.

Air Compressor

Figure 26:
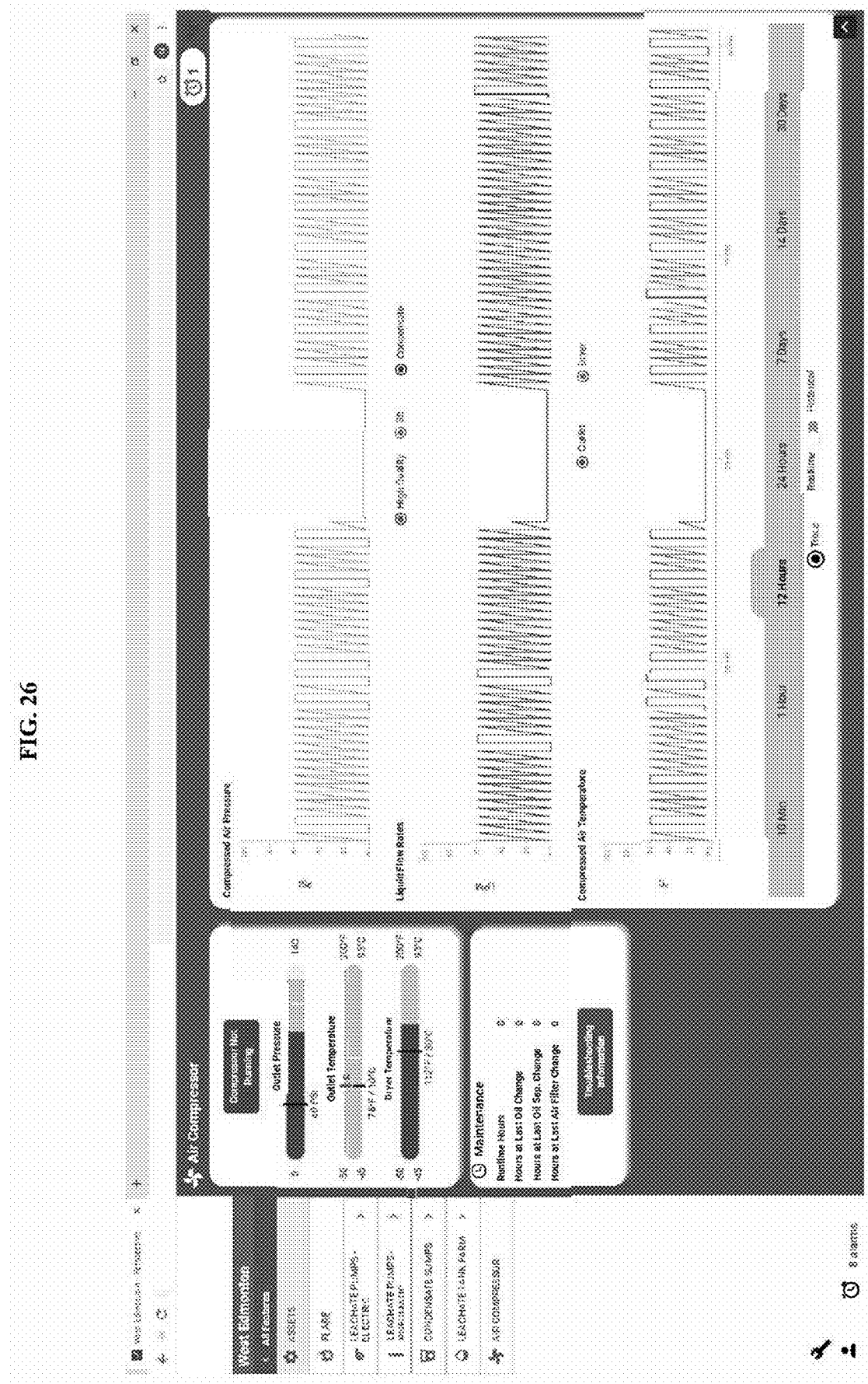
FIG. 26 is an air compressor screen in accordance with an illustrative embodiment of the presently disclosed subject matter.

An illustrative embodiment of an Air Compressor Screen for the presently disclosed system and method is shown in FIG. 26. The Air Compressor screen includes three main panels. Please see above for general screen panel functionality common to the Air Compressor screen. The following summarizes the unique features of this screen.

(i) Top Left Panel—Provides an indicator of the running status of the air compressor and real-time data from the compressor in the form of process bars. The running indicator uses both text and color to depict if the compressor is running: green if running and red if not running. The process bars each include a black line indicator as well as a label showing the data value and unit. The bar background color signifies the alarm state of the compressor. The normal operating range between the high and low levels remains grey regardless of alarm state. When the value is within the normal operating range, the outer ranges are colored light grey. When the value exceeds the high level, the upper range turns red. The lower range turns red when the value drops below the low level. See FIG. 27 for the Air Compressor Settings popup window made available by clicking on each of the process bars.

Figure 28:
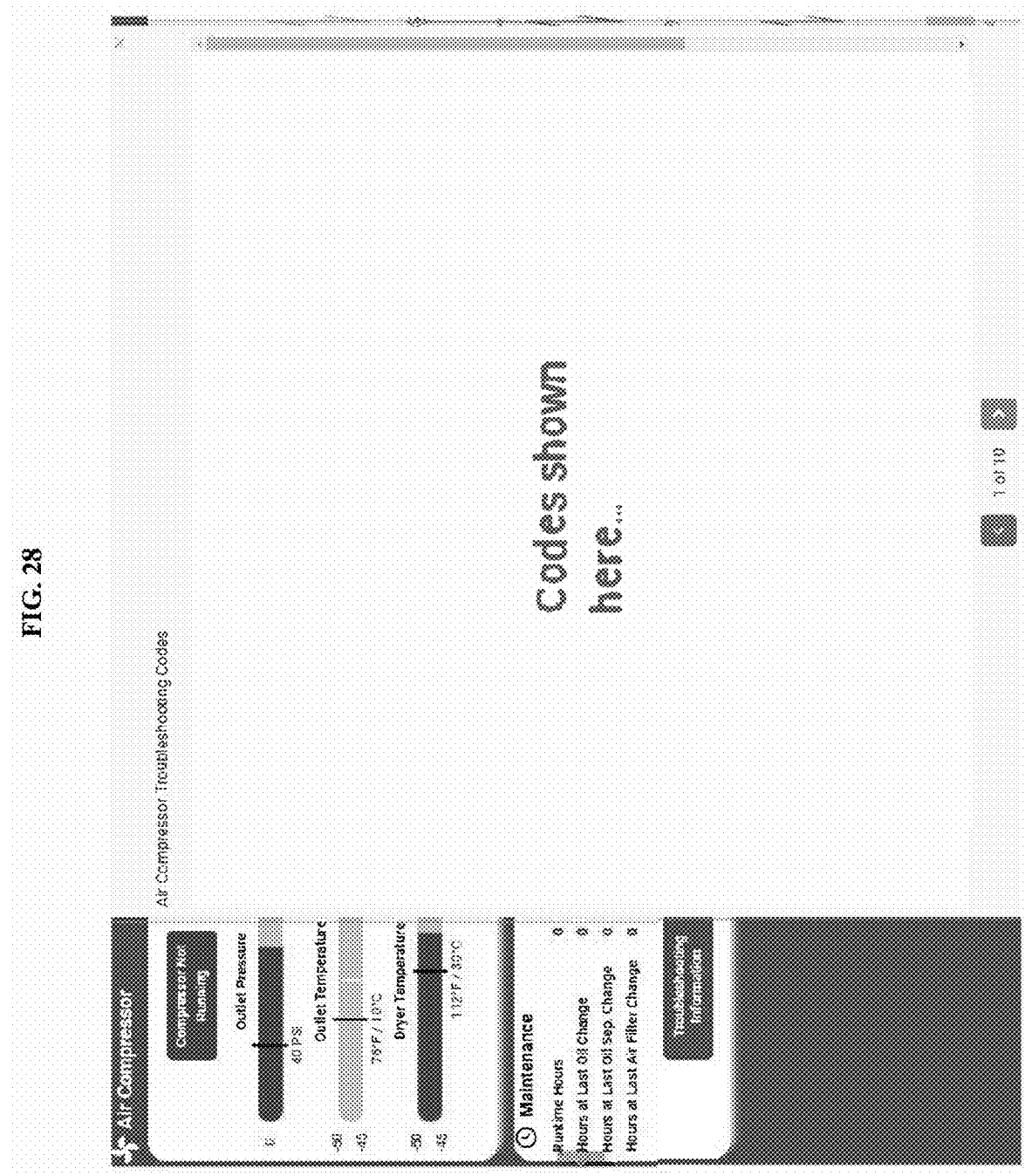
FIG. 28 is a troubleshooting section of an air compressor user manual in accordance with an illustrative embodiment of the presently disclosed subject matter.

(ii) Bottom Left Panel—Displays maintenance information for the air compressor. The counters are not able to be reset through the Ignition SCADA system. Clicking on the "Troubleshooting Information" button will open a popup window called "Air Compressor Troubleshooting Codes" which contains a PDF document of the troubleshooting section of the air compressor user manual, see FIG. 28. This will allow the user to reference detailed information and next steps to resolve the alarm code, which will appear in the specific air compressor alarms page accessible by clicking the alarm icon in the page header bar. To close the popup, click the X button in the top right corner.

Figure 27:
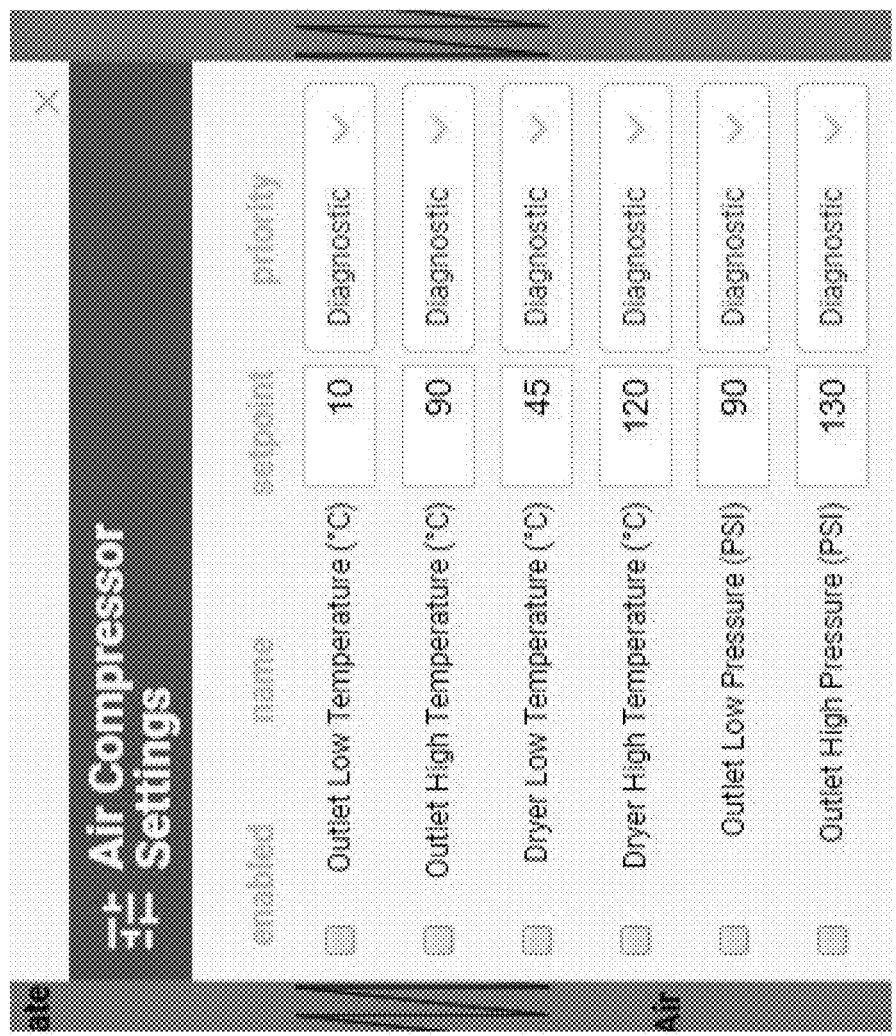
FIG. 27 is an air compressor settings popup window in accordance with an illustrative embodiment of the presently disclosed subject matter.

An illustrative embodiment of a Air Compressor Settings Popup Window for the presently disclosed system and method is shown in FIG. 27. Clicking on any of the process bars will open the popup window called Air Compressor Settings. From this window, alarms can be enabled or disabled and the user can configure setpoint values and alarm priorities. To close the popup, click the X button in the top right corner.

Trends

Figure 29:
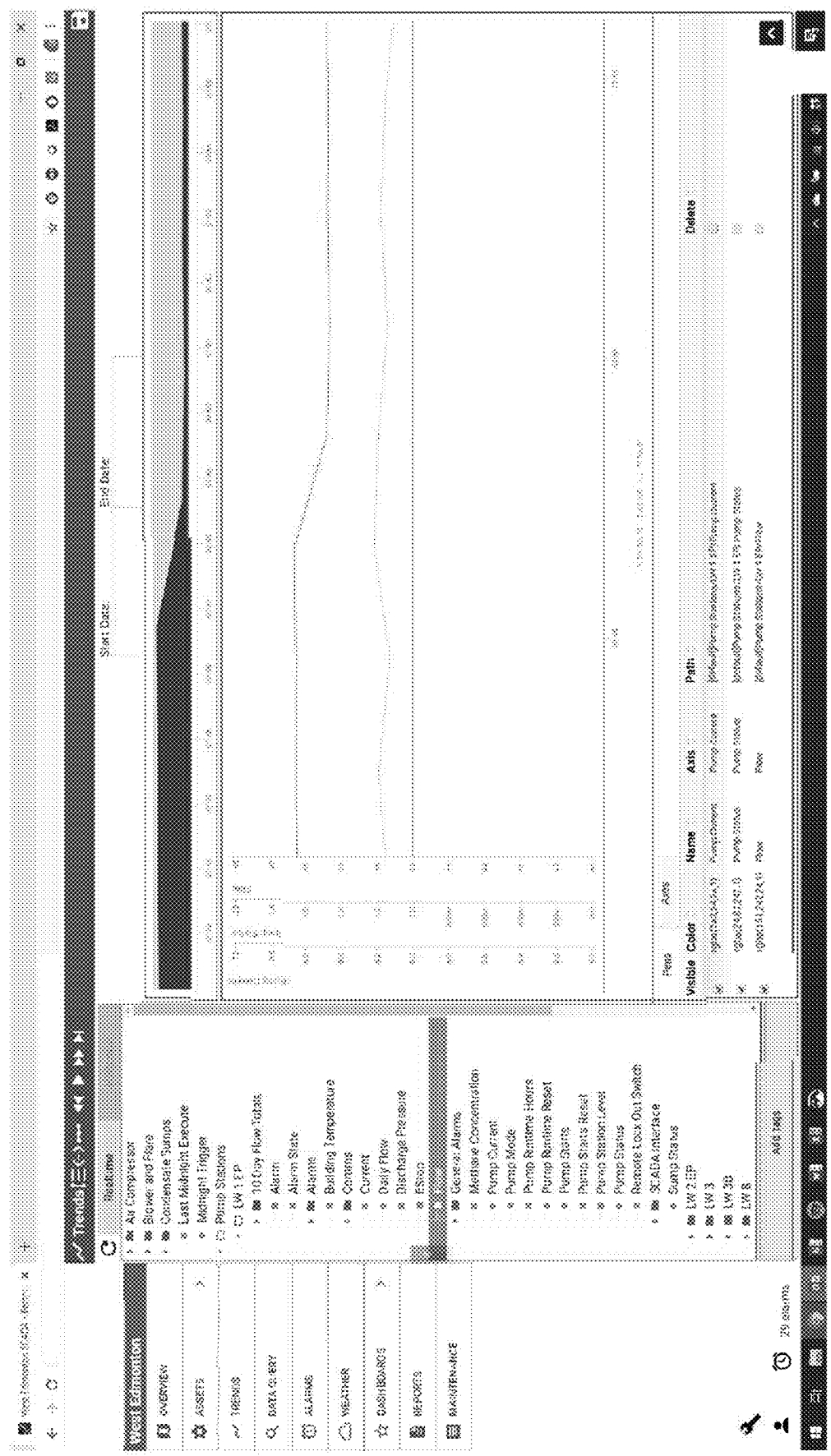
FIG. 29 is a trends screen in accordance with an illustrative embodiment of the presently disclosed subject matter.

An illustrative embodiment of a Trends Screen for the presently disclosed system and method is shown in FIG. 29. The Trends screen shows real-time and historical trends for the tags in the system in the form of a time-series chart.

On the left side of the screen is a file selection pane where one or more tags can be selected to view on the chart. To select more than one tag, hold the Ctrl key while clicking the desired tags. Folders can be drilled into by clicking the small arrows next to the folder name. To add the selected tags to the chart, click on the Add Tags button at the bottom of the selection pane. At the top of the file selection pane, the circular arrow icon is used to refresh the file list and close all open folders.

The Realtime and Historical tabs are used to select between real-time and historical tags. The data is displayed on a chart in the middle of the screen. When using Historical mode, two date and time selectors will appear above the chart allowing the user to specify the start and end dates of the data set.

Below the chart are two tabs titled Pens and Axes. The Pens tab allows the user to configure the appearance of the data sets on the table, while the Axes tab allows the user to configure the appearance of the chart's axes.

The screen header contains a number of options to use to format the chart which can be selected by clicking on their respective icons. Hovering over these icons creates a small popup window containing the name of the tool. Split Plots creates a separate plot for every selected tag. The Combine Axes option creates a shared Y-axis for every tag. This cannot be used with the Split Plots option. The X-trace option creates a small popup containing the tag values and timestamp of that data point when hovering the mouse cursor over the chart. The play icon enables Real-time Mode which displays data for the selected tags over the last specified amount of time, defaulting to 5 minutes, and updates in real-time. In this mode, the Start Date and End Date options are replaced by a numeric text field and a dropdown list containing the available units of time. The Step Back, Step Forward, and Step to End options are used to navigate the chart along the time axis. These options do not work when the Real-Time Mode option is selected. The Save icon at the right side of the header is used to save the chart's data as an XML file, which can be viewed in Excel.

Data Query

Figure 30:
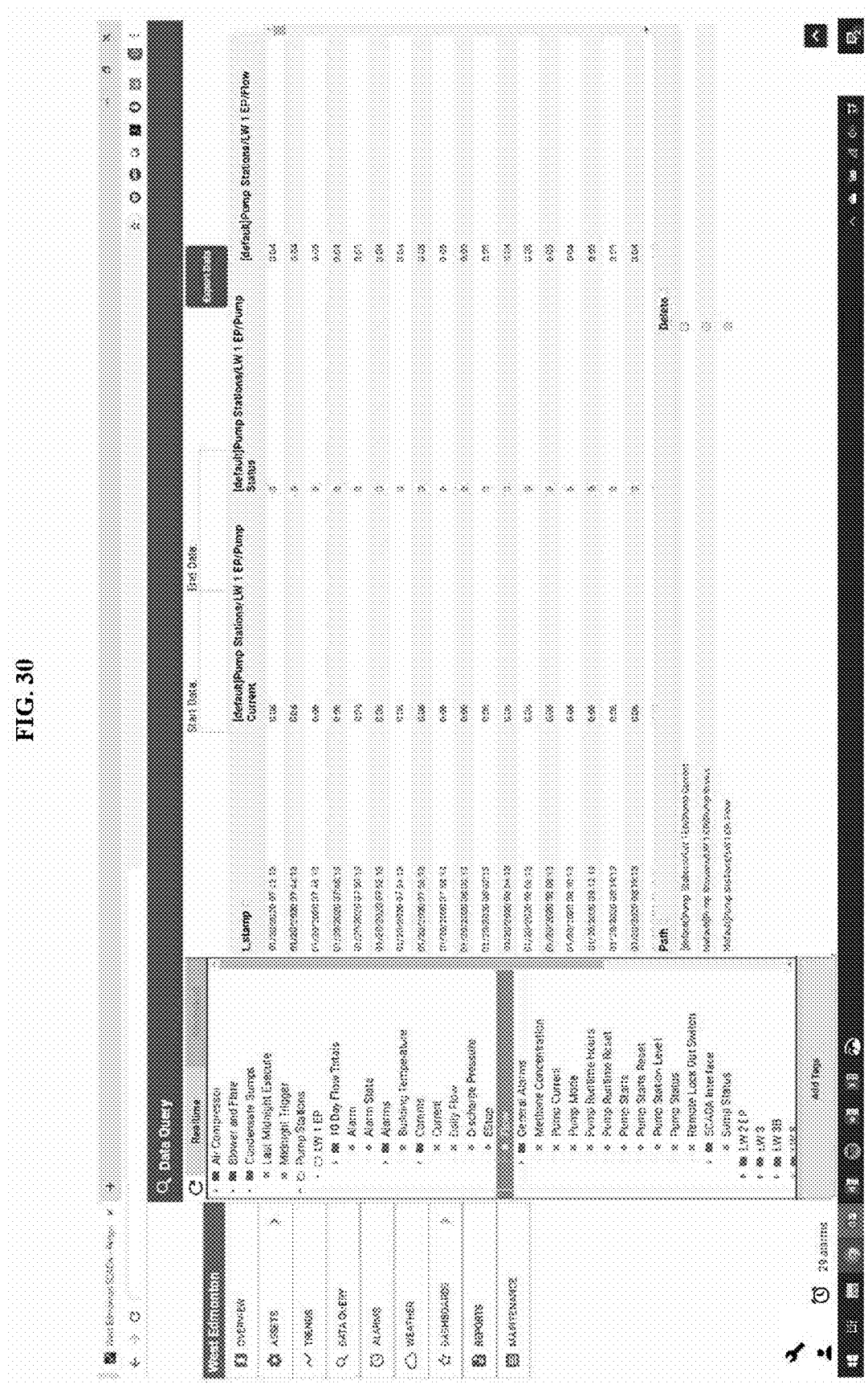
FIG. 30 is a data query screen in accordance with an illustrative embodiment of the presently disclosed subject matter.

An illustrative embodiment of a Data Query Screen for the presently disclosed system and method is shown in FIG. 30. The Data Query page is nearly identical to the Trends page, but instead of displaying the data as a time-series chart, it displays the data in a table. The table columns are populated by the tags that have been selected, while the rows are the timestamps for each data point. To change the time-frame of the date, use the two date and time selectors above the table.

The table can be saved on the server as a CSV file by clicking the "Export Data" button in the top right corner of the screen. This file can be viewed using Excel.

Alarms

Figure 31:
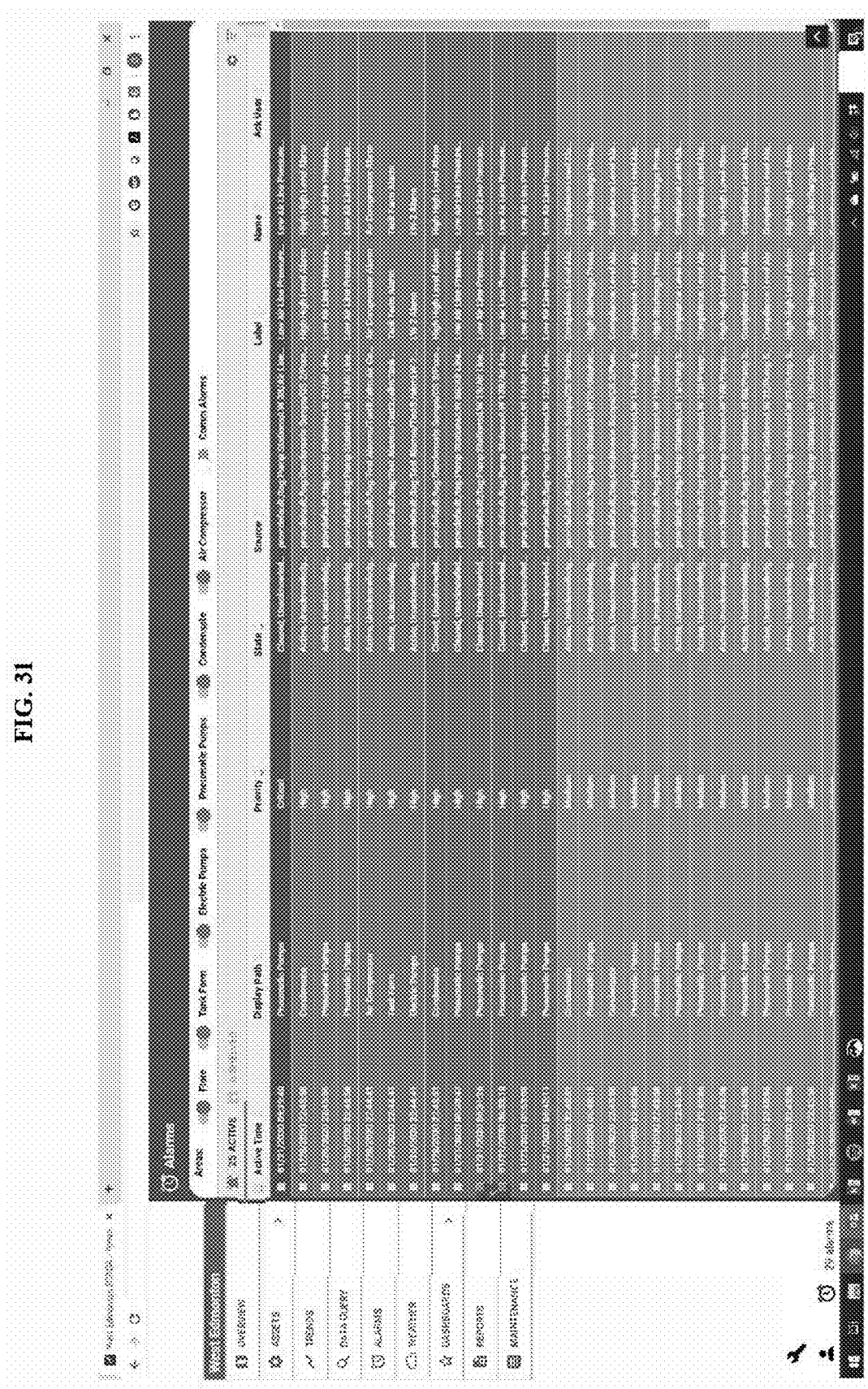
FIG. 31 is an alarms screen in accordance with an illustrative embodiment of the presently disclosed subject matter.

An illustrative embodiment of an Alarms Screen for the presently disclosed system and method is shown in FIG. 31. Selecting the Alarms button on the side navigation bar opens the Alarms screen which displays the current alarms in a table. At the top of the table, toggle switches are used to filter the shown alarms by their source path. Below the toggle switches are two tabs to switch between showing either the active or shelved alarm tables. To the right of the tabs are two icons that allow to fine-tuned control over the table's contents. The gear icon is used to configure which data columns are displayed on the table. Clicking on the filter icon creates a search bar below the icons which allows for filtering table contents by specific keywords. The dropdown list to the left of the text field is used to limit the results to specific alarm states. The contents of the table can be sorted by clicking on the column titles to sort top to bottom or bottom to top. Data can be only be sorted by one column at a time. The color of each alarm represents its current state. Red signifies that the alarm is active and unacknowledged, while the vibrancy of the red represents the priority: deep red for high priority and light red for low priority. Blue alarms signify that the alarm is cleared and unacknowledged, and once again the vibrancy signifies the priority of the alarm, with a more vibrant blue representing a higher priority. Alarms may be acknowledged or shelved for a set period of time by selecting the alarm's check box and using the controls that pop-up at the bottom of the screen.

Figure 32:
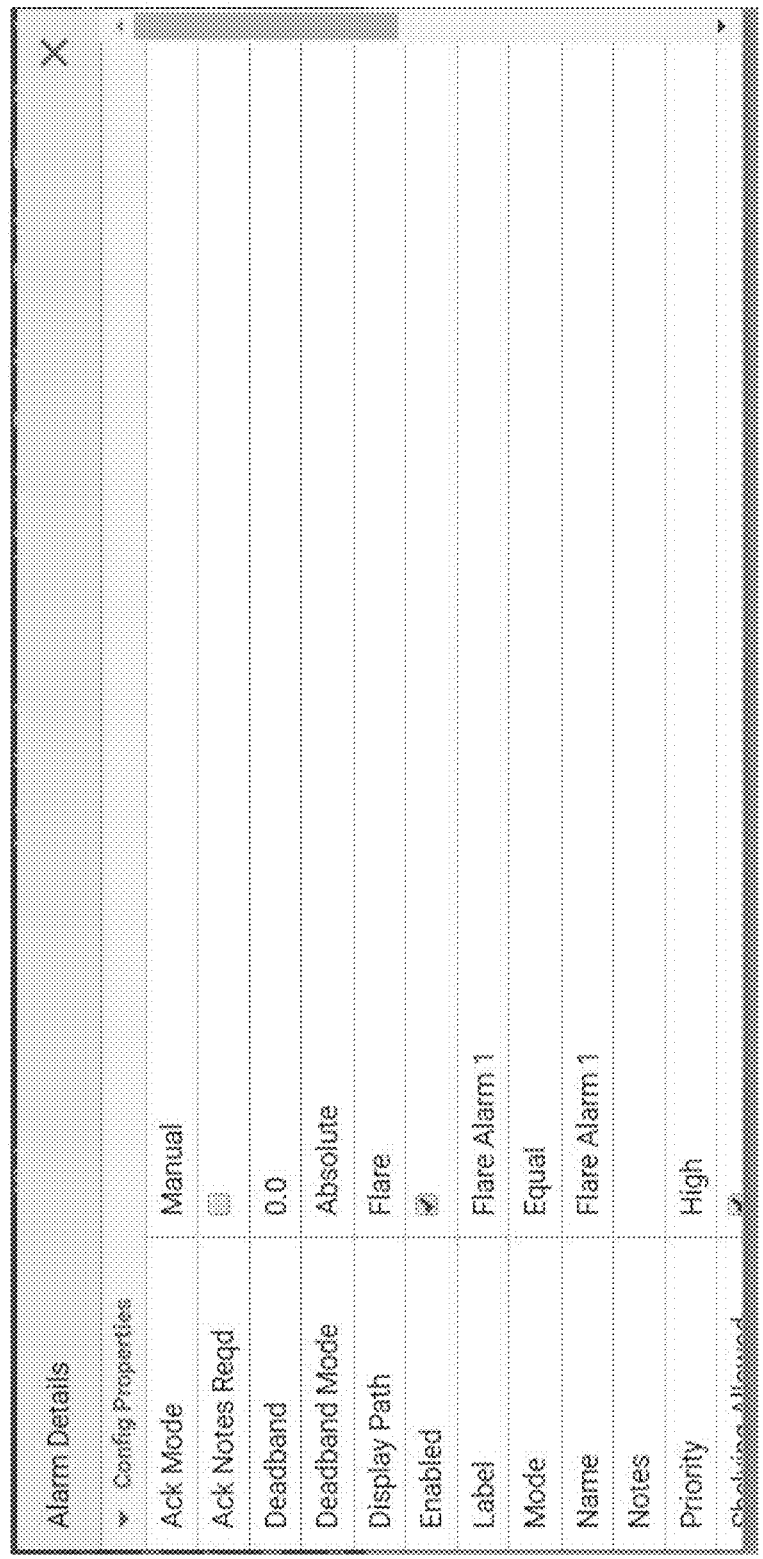
FIG. 32 is an alarm detail popup window in accordance with an illustrative embodiment of the presently disclosed subject matter.

An illustrative embodiment of an Alarm Detail Popup Window for the presently disclosed system and method is shown in FIG. 32. Hovering the mouse over an alarm reveals a grey tag icon at the right end of the alarm row. Clicking on this icon opens the Alarm Details popup window which provides specific details about the alarm split between two categories, Config. Properties and On Active. Both categories can be minimized or expanded. The information displayed on this window cannot be modified.

Weather

An illustrative embodiment of a Weather Screen for the presently disclosed system and method is provided herein. Clicking on a Weather button on the side navigation bar will open a new browser tab redirecting to a weather website which has been preconfigured to load showing wind patterns for the location of the facility. The site can have many different options to view different weather patterns and overlays. Returning to the Ignition page tab, the weather screen can display text letting the user know that the weather website has opened on a different tab.

Dashboards

From the main menu, clicking the Dashboards button will open a submenu containing the five available dashboards including Flow Overview, Pumps Overview, Alarm Analysis, Level Analysis, and Comms Overview.

Flow Overview.

Figure 33:
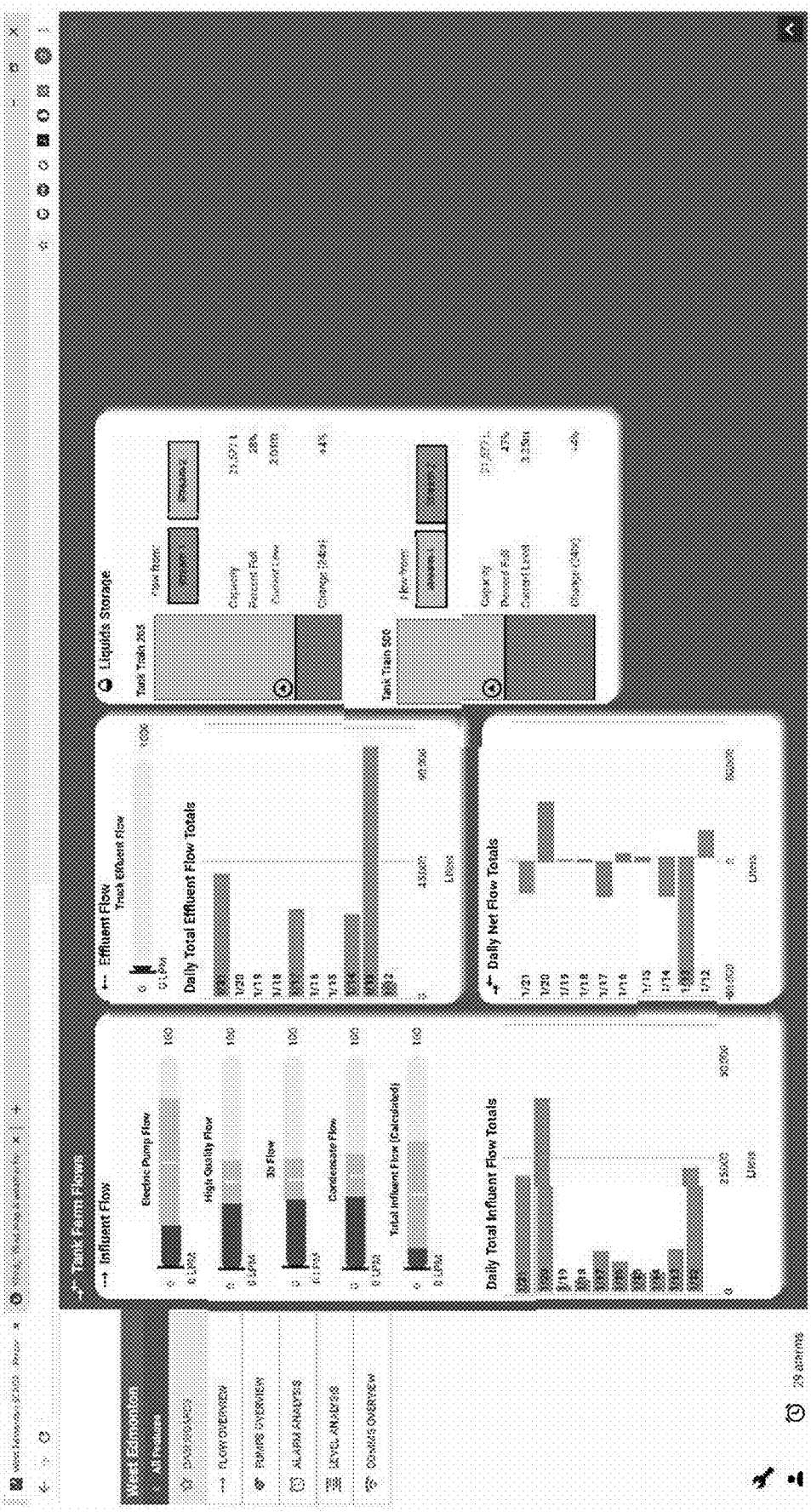
FIG. 33 is a tank farm flows overview screen in accordance with an illustrative embodiment of the presently disclosed subject matter.

An illustrative embodiment of a Tanks Farm Flows Overview Screen for the presently disclosed system and method is shown in FIG. 33. FIG. 33 presents the Flow Overview Screen titled Tank Farm Flows that includes four main panels. The following summarizes the features of this screen.

(i) Left Panel—Influent Flow provides real-time data for the influent flow in the form of process bars and daily influent flow totals in the form of a bar chart. The process bars each include a black line indicator as well as a label showing the data value and unit. The background color of each bar signifies the alarm state of that flow path. The normal operating range between the high and low levels remains grey regardless of alarm state. When the value is within the normal operating range, the outer ranges are colored light grey. When the value exceeds the high level, the upper range turns red. The bar chart shows the totaled daily flow totals for all flow paths for the past ten days. Each bar is colored green with the date displayed to the left. Hovering the mouse over a bar or tapping on a mobile device will create a small popup containing the data value. This popup will disappear when the mouse is moved off the bar or the screen is tapped elsewhere. See FIG. 19-20, and related popup descriptions, for popup windows made available by clicking on each of the process bars.

(ii) Middle Top Panel—Effluent Flow provides real-time data for effluent flows in the form of process bars and daily influent flow totals in the form of a bar chart. This panel has the same functionality as the first panel. Clicking on the Truck Effluent Flow process bar will open the Influent/Effluent Flow Settings popup window, see FIG. 21.

(iii) Middle Bottom Panel—Daily Net Flow Totals shows the daily net flow totals for the past ten days in the form of a bar chart. Each bar is colored green with the date displayed on to the left. Hovering the mouse over a bar or tapping on a mobile device will create a small popup containing the data value. This popup will disappear when the mouse is moved off the bar or the screen is tapped elsewhere.

(iv) Right Panel—Liquids Storage provides real-time capacity data for the storage tank trains. The two tank graphics each represent an entire tank train and include a black line capacity indicator. There is also an indicator depicting which stream is the input source for that tank train and a legend showing the data values and units. The chevron icons show the capacity trend of that tank train for the past hour. See FIG. 23, and related popup description, for the Level Settings popup window made available by clicking on each of the tank icons.

Pumps Overview

Figure 34:
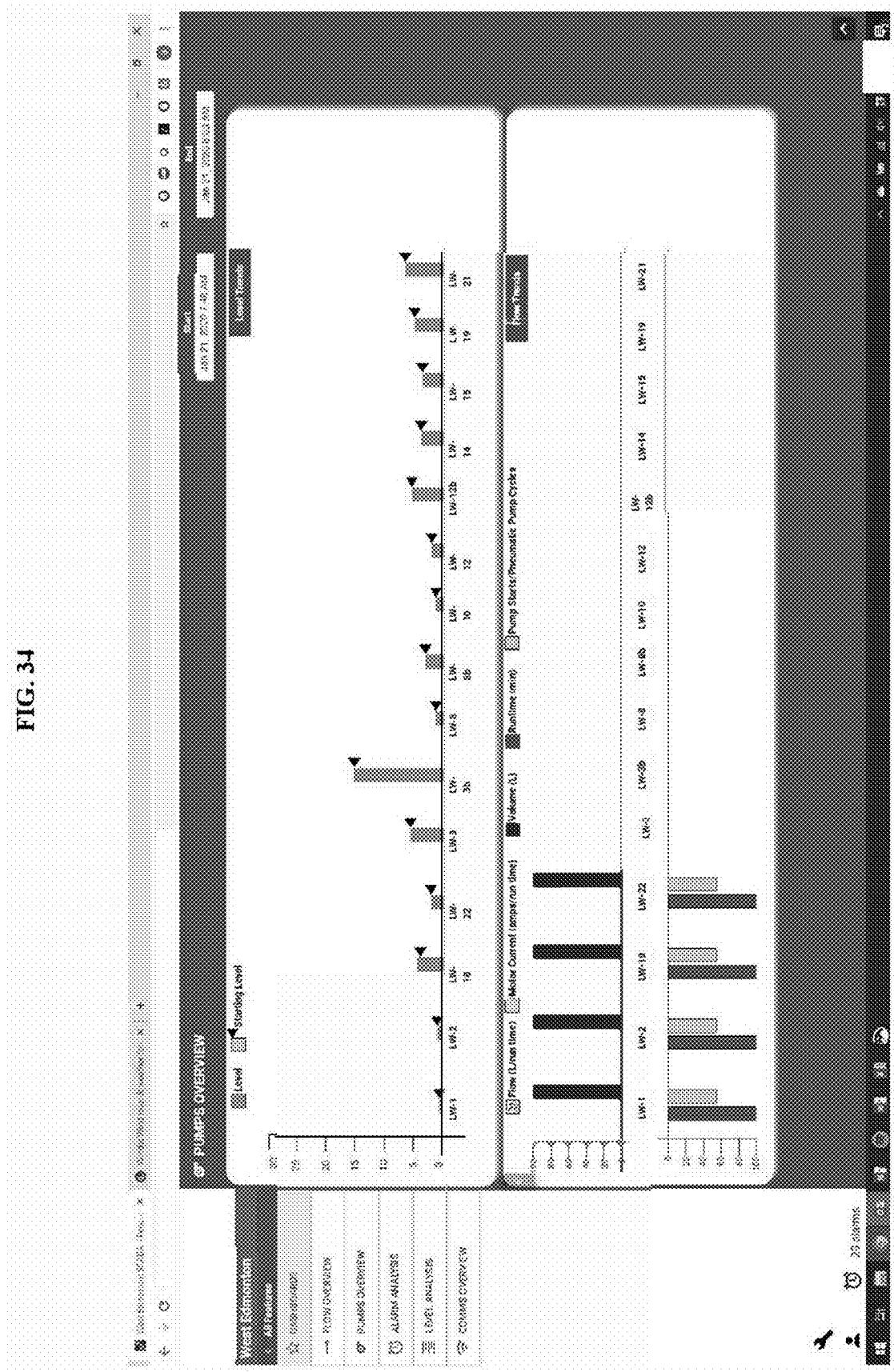
FIG. 34 is a pumps overview screen in accordance with an illustrative embodiment of the presently disclosed subject matter.

An illustrative embodiment of a Pumps Overview Screen for the presently disclosed system and method is shown in FIG. 34. From the Dashboards submenu, the Flow Overview screen displays information about the electric and pneumatic pumps. The screen is divided between two main panels with similar functionality, as both contain a bar chart and a time-series chart. The time-scale for the charts in both panels can be adjusted using the Start and End date and time selectors in the top-right corner of the screen.

The top panel provides level analysis of the pumps. The bar chart shows the level of each pump at the start and end times selected. The bottom panel shows data for the flow, motor current, volume, runtime, and the number or starts or pump cycles for each pump as a bar chart. Please note that this screen will only show data for one pump at a time on mobile. The selected pump can be changed via a dropdown menu or by swiping side-to-side.

Figure 35:
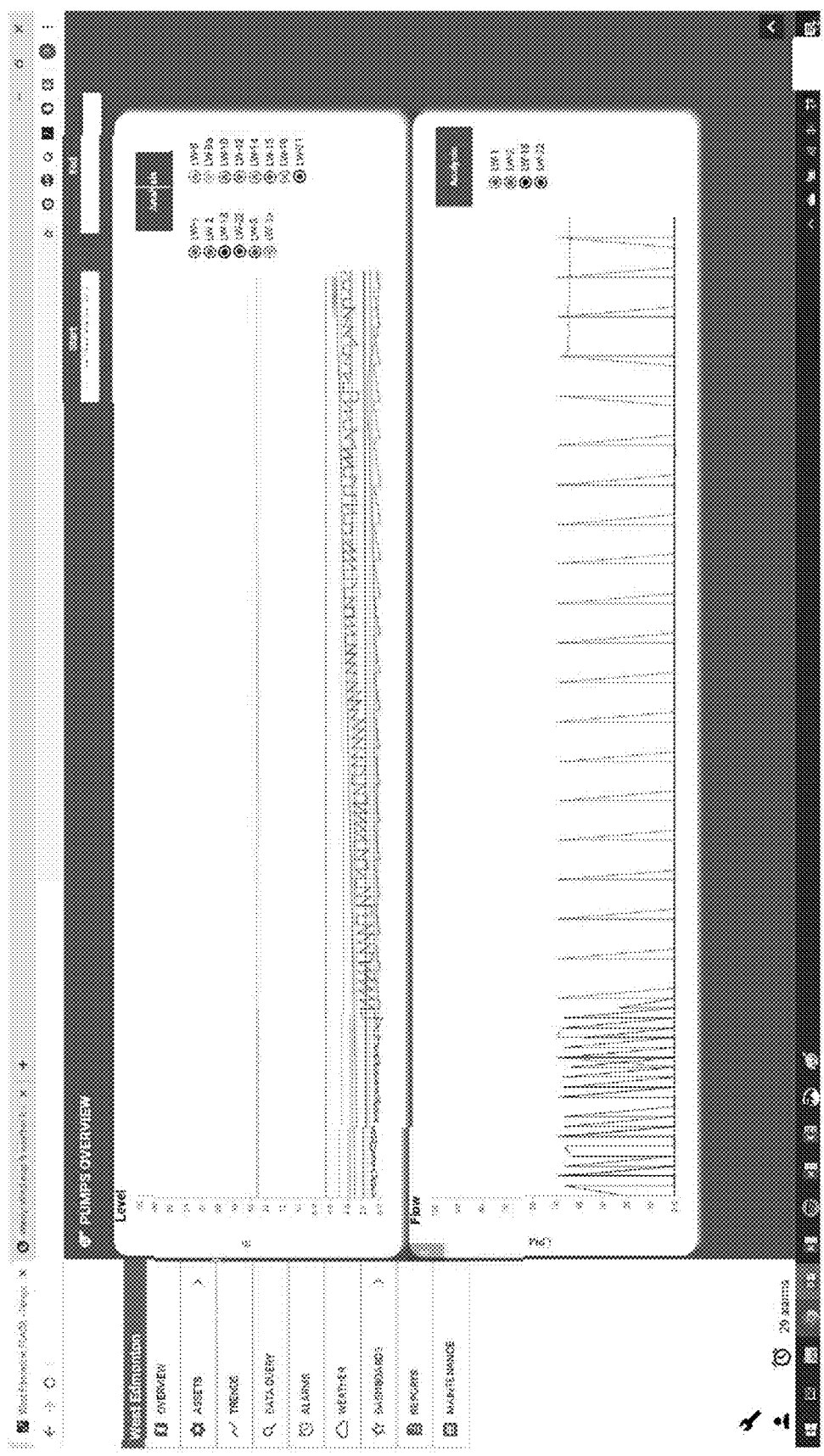
FIG. 35 is a pumps overview trends and graphs screen in accordance with an illustrative embodiment of the presently disclosed subject matter.

An illustrative embodiment of a Pumps Overview Trends Graphs screen for the presently disclosed system and method is shown in FIG. 35. Clicking on the Level Trends button in the top panel switches the panel from a bar chart to a time-series chart showing the level of all of the pumps over the time-frame selected.

Clicking the Flow Trends button in the bottom panel switches from the bar chart to a time-series chart showing the flow rate of all of the electric pumps over the time-frame selected (there is no flow data for the pneumatic pumps).

The charts in both panels function identically. To toggle the visibility of the pens of the different pumps, click on the colored circle icon next to the pump name in the legend on the right side of the chart. Hovering the mouse cursor over a dataset creates a grey line on the chart and small popup containing the timestamp and the data of all visible pumps at that time. The time scale of each chart can be individually managed by clicking and dragging the data-series or by using the mouse scroll wheel, and can be reset by clicking the icon that appears in the top right corner of the chart. To switch either panel back to the bar chart, click the Analysis button on the right side of each respective panel.

Alarm Analysis

Figure 36:
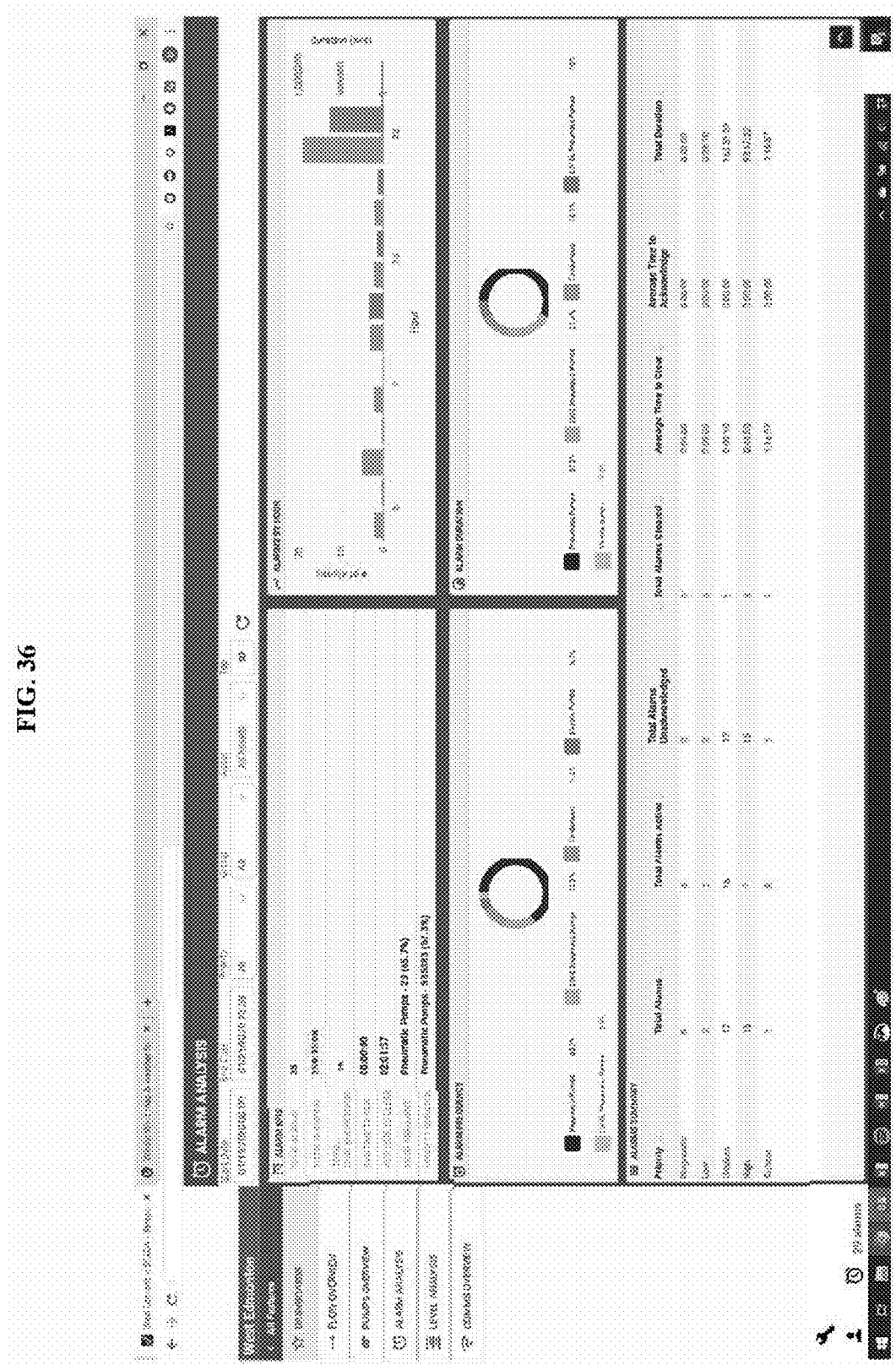
FIG. 36 is an alarm analysis screen in accordance with an illustrative embodiment of the presently disclosed subject matter.

An illustrative embodiment of an Alarm Analysis Screen for the presently disclosed system and method is shown in FIG. 36. From the Dashboards submenu, the Alarm Analysis screen shows aggregated details about alarms triggered during a specific time-frame.

At the top of the screen there are two date and time selectors used to select the start and end times of the time-frame to analyze. Next to the selectors, dropdown lists are used to filter alarm results by priority, asset group, or by a specific asset. A numeric text field is used to specify the total number of alarm results to analyze. This number will only affect the results if there are more alarms in the selected time-frame than the specified number limit. To apply the selected filters, click the refresh arrow to the right of the numeric text field. The results are split into five panels which display the data in different formats.

(i) Top Left Panel—Provides the Alarm Key Performance Indicators (KPIs) in a table, including but not limited to total alarms, total duration in an alarm state, and average time to acknowledge and clear.

(ii) Top Right Panel—Provides a time-series chart of the number of alarms per hour and the duration they lasted. Hovering the mouse cursor over or tapping on the chart creates guiding lines and labels showing the data values at that place in the chart.

(iii) Middle Left and Right Panels—Contain pie charts showing alarm frequency and duration percentages. Hovering the mouse cursor over or tapping the panels of these charts opens a small popup window displaying the name and percentage of the alarm.

(iv) Bottom Panel—Provides a table showing a summary of the alarms by priority. The table can be sorted by clicking on the column headings. Only one column can be used to sort at a time.

Level Analysis

Figure 37:
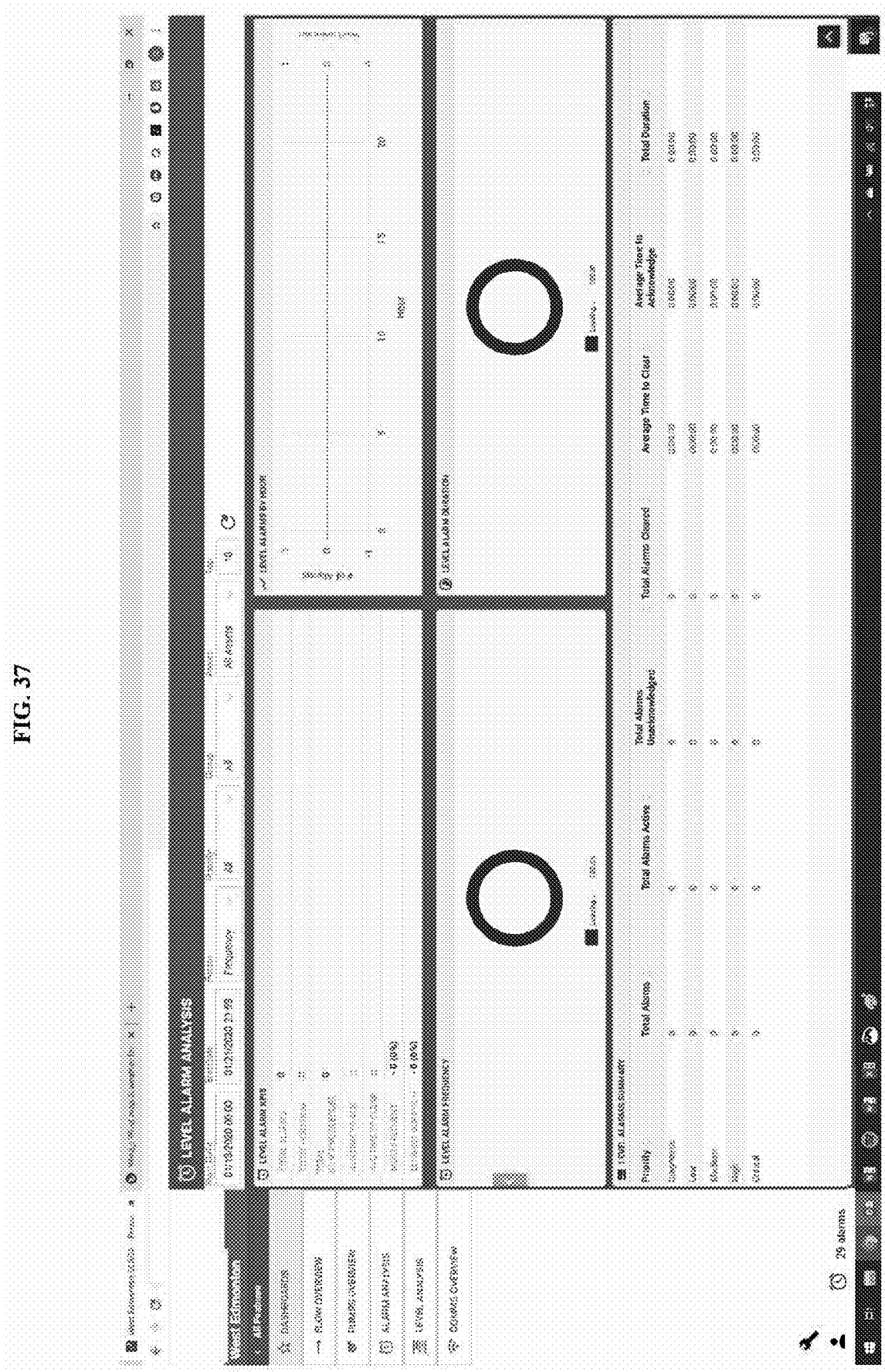
FIG. 37 is a level alarm analysis screen in accordance with an illustrative embodiment of the presently disclosed subject matter.

An illustrative embodiment of a Level Alarm Analysis Screen for the presently disclosed system and method is shown in FIG. 37. From the Dashboards submenu, the Level Analysis screen shows aggregated details about the level alarms triggered during a specific time-frame.

At the top of the screen there are two date and time selectors used to select the start and end times of the time-frame to analyze. Next to the selectors, dropdown lists are used to filter level alarm results by frequency or duration, priority, asset group, or by a specific asset. A numeric text field is used to specify the total number of level alarm results to analyze. This number will only affect the results if there are more level alarms in the selected time-frame than the specified number limit. To apply the selected filters, click the refresh arrow to the right of the numeric text field. The results are split into five panels which display the data in different formats.

(i) Top Left Panel—Provides displays the Level Alarm KPIs in a table, including but not limited to total alarms, total duration in an alarm state, and average time to acknowledge and clear.

(ii) Top Right Panel—Provides a time-series chart of the number of level alarms per hour and the duration they lasted. Hovering the mouse cursor over or tapping on the chart creates guiding lines and labels showing the data values at that place in the chart.

(iii) Middle Left and Right Panels—Contain pie charts showing level alarm frequency and duration percentages, respectively. Hovering the mouse cursor over or tapping the panels of these charts opens a small popup window displaying the name and percentage of the alarm.

(iv) Bottom Panel—Provides a table showing a summary of the level alarms by priority. The table can be sorted by clicking on the column headings. Only one column can be used to sort at a time.

Comms Overview

Figure 38:
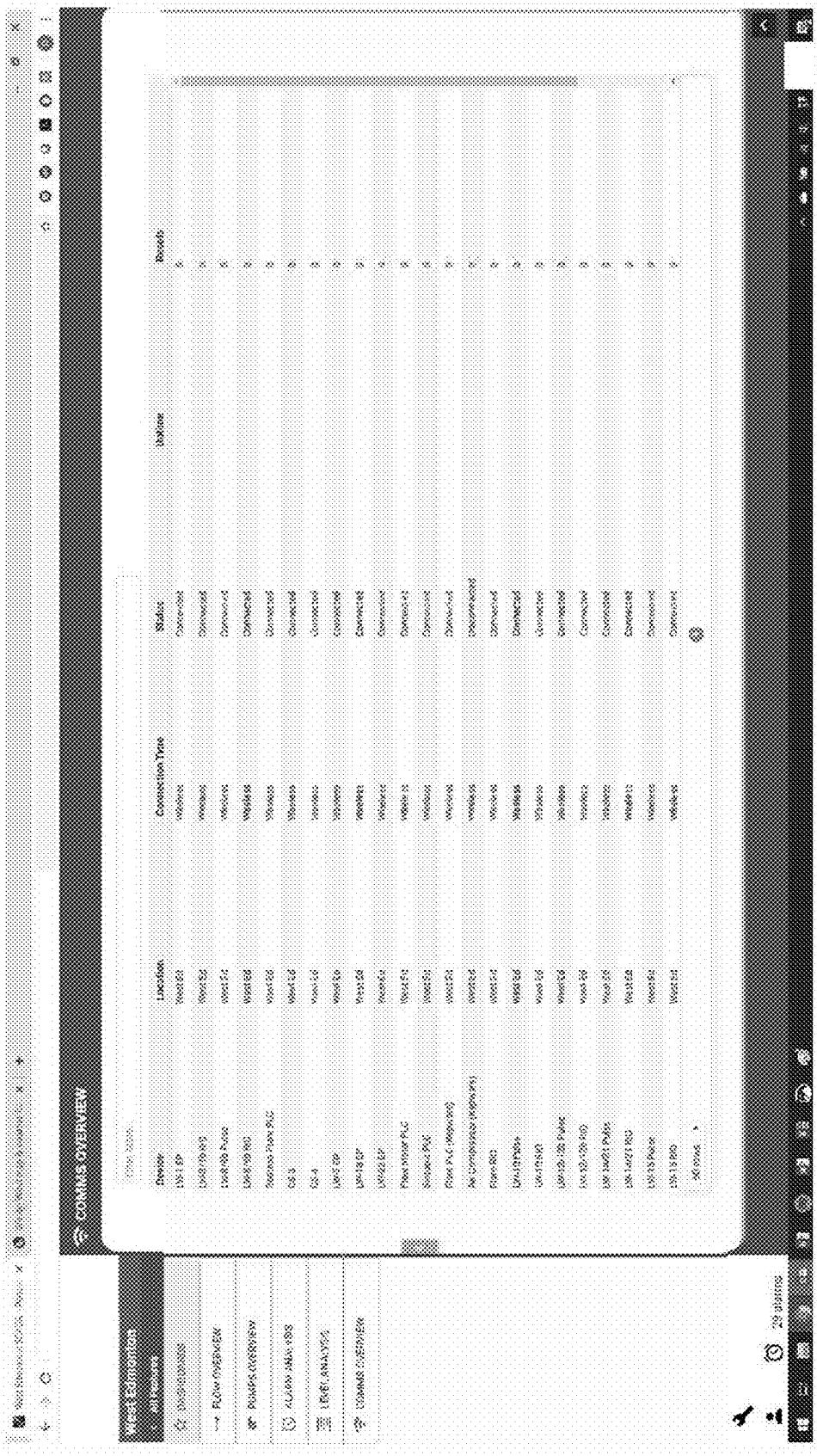
FIG. 38 is a communications overview screen in accordance with an illustrative embodiment of the presently disclosed subject matter.

An illustrative embodiment of a Comms Overview Screen for the presently disclosed system and method is shown in FIG. 38. From the Dashboards submenu, the Comms Overview button displays a screen with a table listing the configured devices with columns containing the device name, location, connection type, connection status, uptime, and number of resets.

The text bar at the top of the screen can be used to filter the device list to only show devices containing the filter text in any category (i.e. wireless would show all devices using a wireless connection type). The dropdown menu in the bottom-left corner is used to change the number of results displayed on each page. If there is more than one page of results, the pages can be navigated by clicking on the numbered page dot icons on the bottom of the screen.

Reports

Figure 39:
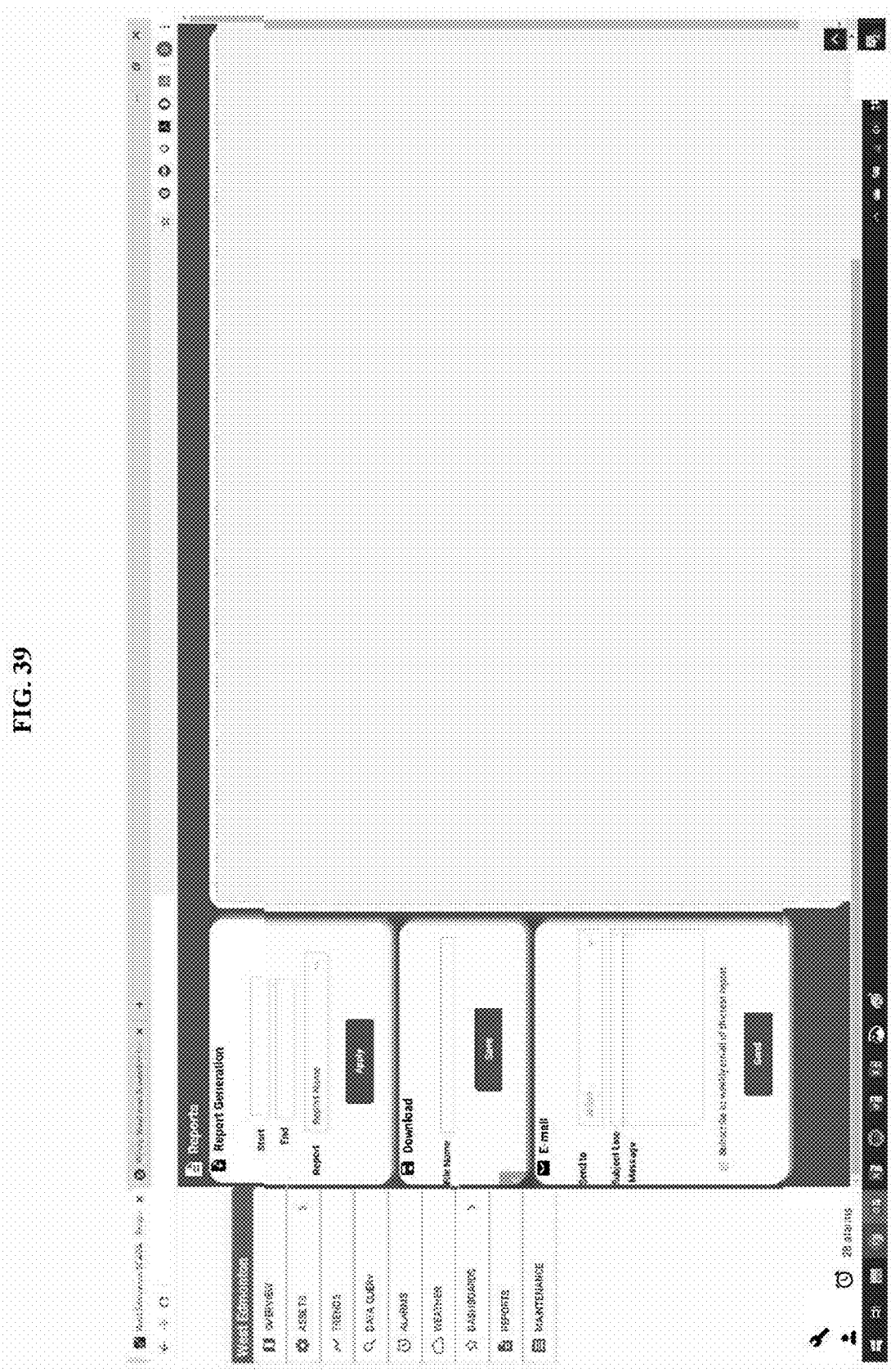
FIG. 39 is a reports screen in accordance with an illustrative embodiment of the presently disclosed subject matter.

An illustrative embodiment of a Reports Screen for the presently disclosed system and method is shown in FIG. 39. The Reports Screen on the side navigation bar allows the user to generate formatted reports.

The first panel of the screen allows the user to select the time-frame of the report using date and time selectors, and the name of the report using a dropdown list. Clicking the Apply button generates the report in the PDF viewer on the right side of the screen. The PDF viewer can be used to preview the report, and pages can be navigated using the arrows at the bottom of the viewer. The Download panel allows the user to name the report using the File Name text field, and save the PDF report by clicking the Save button. The E-mail panel allows the report to be sent to an email address. The recipient is selected using the dropdown list of pre-registered accounts. The Subject Line and Message text fields are used to customize the contents of the email. The checkbox below the text fields allows the recipient to be subscribed to receive an email containing a report every week. To send the email, click the Send button.

Maintenance

Figure 40:
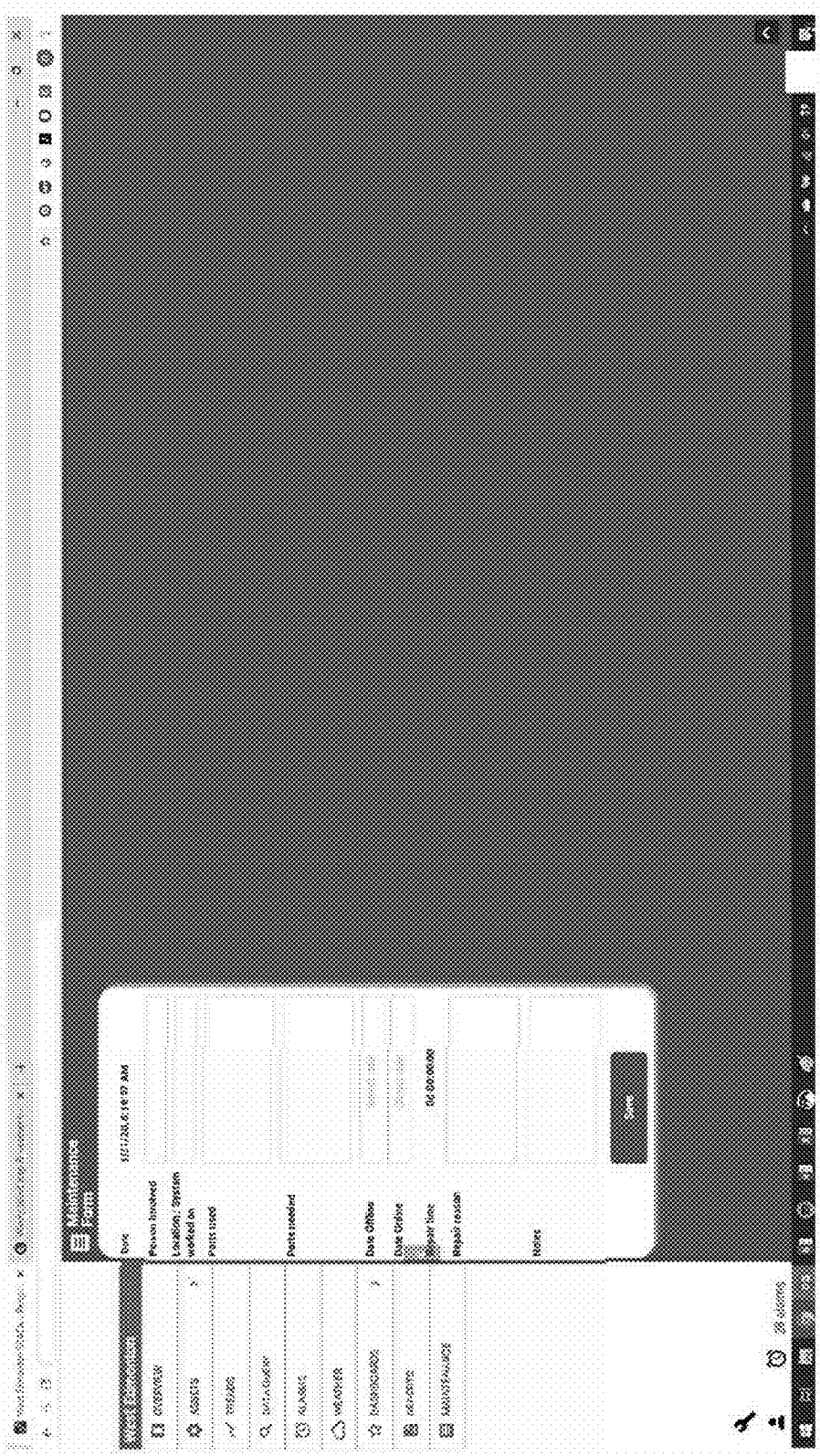
FIG. 40 is a maintenance form screen in accordance with an illustrative embodiment of the presently disclosed subject matter.

An illustrative embodiment of a Maintenance Form Screen for the presently disclosed system and method is shown in FIG. 40. The Maintenance screen on the side navigation bar is used to create maintenance reports. The text fields are used to fill out the details of the report, while date and time selectors are used to specify when the equipment was offline. When the form has been completed, clicking the Save button will save the report to the server.

Setpoint Screen

Figure 41:
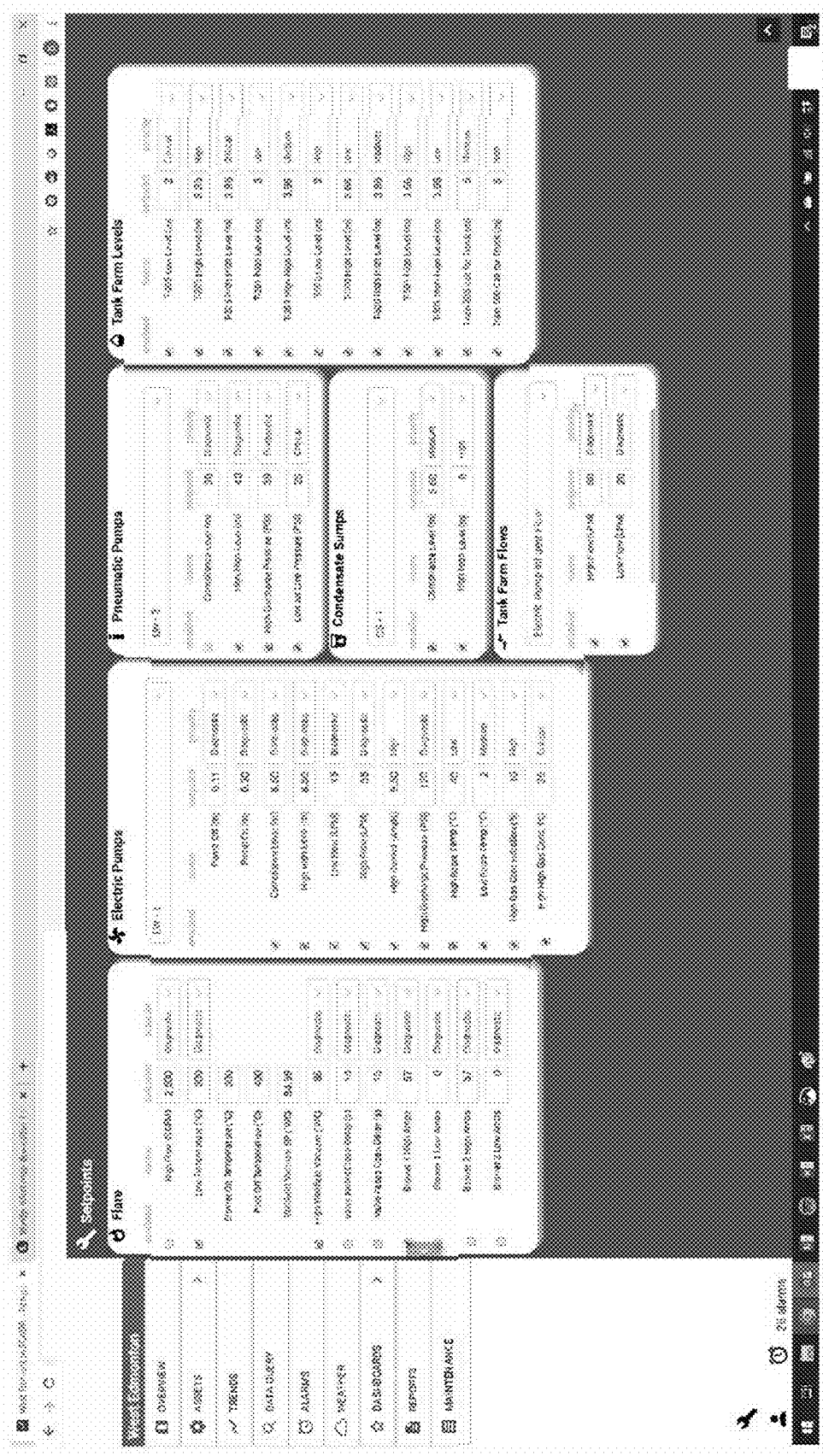
FIG. 41 is a setpoint screen in accordance with an illustrative embodiment of the presently disclosed subject matter.

An illustrative embodiment of a Setpoint Screen for the presently disclosed system and method is shown in FIG. 41. The Setpoint screen is accessible by clicking on the wrench icon located at the bottom left of the side navigation bar.

The Setpoint Screen provides an overview of the available setpoints for each asset type (i.e. flare, electric pumps, pneumatic pumps, condensate sumps, influent flows, and tank levels) where setpoints can be configured in one place. Each setpoint's alarm can be enabled or disabled using the checkbox, the setpoint value can be changed using the numeric text field, and the alarm priority can be changed using the dropdown list. The dropdown lists at the top of some panels are used to select which device of that type to configure.

The presently disclosed system and method have a number of practical applications. For example, the system and method allow for intelligent and remote operation and control of specific equipment at the landfill site. As used in this context, the term "remote" can mean distant from, or not physically present at, the landfill site, or can include: locations that are either on-site or off-site with respect to the landfill, such as, for example, where the remote location is a location outside of the room from, or in a different specific area of the plant floor from, where the equipment being controlled is located. This gives frontline operators the ability to analyze changing activities from anywhere, and enables engineers, technicians and managers to work in a long-range capacity and collectively to operate the facility.

In certain illustrative embodiments, a system for remote monitoring and control of flare activity in a landfill facility for disposal of waste materials is provided herein. The system can include: a memory; a display for viewing by a user; a processor coupled to the memory programmed with executable instructions, the instructions including a landfill data interface for obtaining specific real-time data relating to landfill activity comprising at least one of temperature data, gas pressure data, gas vacuum data, gas flow data, blower motor current, vacuum target setpoint and gas flow target setpoint; a flare control valve or blower speed that is connected to a flare gas supply from the landfill and is operable to regulate the amount of flare gas delivered to the flare; and a monitoring component for: (a) comparing the obtained landfill activity real-time data with pre-stored information from a database, and (b) analyzing the difference between the obtained landfill activity real-time data and the stored information to identify whether the landfill activity has surpassed a pre-set threshold value, wherein the pre-set threshold value is based on one or more of gas pressure/vacuum, gas flow, and flare temperature, and (c) displaying the analysis results on the display, and (d) automatically sending a control signal to the flare control valve or blower speed to increase or decrease the amount of flare gas provided to the flare based on the results of the analysis of the landfill activity real-time data.

In certain illustrative embodiments, a method for remotely monitoring and controlling flare activity in a landfill facility for disposal of waste materials is provided herein. The method can include: (a) causing flare gas from the landfill facility to engage a flare control valve or blower speed that is automatically operable and capable of supplying flare gas to the flare; (b) obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint; (c) comparing the obtained landfill activity data with pre-stored information from a database; (d) analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature; and (e) automatically operating the flare control valve or blower speed by the processor sending a control signal to the flare control valve to increase or decrease the amount of flare gas supplied to the flare, based on the results of the analysis of the landfill activity data.

In certain illustrative embodiments, a system for remote monitoring and control of flare activity in a landfill facility for disposal of waste materials is provided herein. The system can include: a memory; a display for viewing by a user; a processor coupled to the memory programmed with executable instructions, the instructions including a landfill interface for obtaining specific real-time data relating to landfill activity comprising at least one of temperature data, gas pressure data, gas vacuum data, gas flow data, blower motor current, vacuum target setpoint and gas flow target setpoint; a flare control valve or blower that is connected to a flare gas supply from the landfill and is operable to regulate the amount of flare gas delivered to the flare; and a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature, and (c) displaying the analysis results as an alarm on the display, and (d) receiving instructions from the user to send a control signal to the flare control valve to increase or decrease the amount of flare gas provided to the flare, based on a determination made by the user after reviewing the results of the analysis of the landfill activity data.

In certain illustrative embodiments, a method for remotely monitoring and controlling flare activity in a landfill facility for disposal of waste materials is provided herein. The method can include: (a) causing flare gas from the landfill facility to engage a flare control valve or blower speed that is automatically operable and supplies flare gas to the flare, (b) obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint, (c) comparing the obtained landfill activity real-time data with pre-stored information from a database, (d) analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature, (e) displaying the analysis results as an alarm on a display for a user, and (f) receiving instructions from the user regarding automatically operating the flare control valve, by sending a control signal to the flare control valve to increase or decrease the amount of flare gas supplied to the flare, based on a determination made by the user after reviewing the results of the analysis of the landfill activity data.

In certain illustrative embodiments, a system for remote monitoring and control of air compressor activity in a landfill facility for disposal of waste materials is also provided herein, comprising of a memory, a display for viewing by a user and a processor coupled to the memory programmed with executable instructions. The instructions including a landfill data interface for obtaining specific real-time data relating to landfill activity comprising at least one of: storage liquid level, air compressor pressure and air compressor temperature, pump status data, pump current data, force main and air supply pressure data. An air compressor that is connected to control valve is operable to regulate the amount of liquid within a landfill cell, tank, gas well or lift-station; and a monitoring component for: (a) comparing the obtained landfill activity real-time data with pre-stored information from a database, and (b) analyzing the difference between the obtained landfill activity realtime data and the stored information to identify whether the landfill activity has surpassed a pre-set threshold value, wherein the pre-set threshold value is composed of landfill liquid levels, volumes, disposal volume and storage capacity, (c) displaying the analysis results on the display, and (d) automatically sending a control signal to the pumps of control valves to increase or decrease the amount of liquid provided to disposal or storage based on the results of the analysis of the landfill activity real-time data.

In certain illustrative embodiments, a method for remotely monitoring and controlling air compressor activity in a landfill facility for disposal of waste materials is also provided herein, comprising: (a) an air compressor that is connected to a control valve is operable to regulate the amount of liquid within a landfill cell, tank, gas well or lift-station; obtaining, by at least one reader device located within the landfill facility, specific real-time data relating to landfill activity comprising at least one of storage liquid level, air compressor pressure, air compressor temperature, pump status data, pump current data, force main and air supply pressure data; (b) comparing the obtained landfill activity data with pre-stored information from a database, (c) analyzing, by a processor, the difference between the obtained landfill activity real-time data and the pre-stored information to identify whether the landfill activity has surpassed a pre-set threshold value, wherein the pre-set threshold value is landfill liquid levels, volumes, disposal volume and storage capacity (d) automatically operating the control valve, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of air compressor activity in a landfill facility for disposal of waste materials is also provided herein, comprising: a memory; a display for viewing by a user; a processor coupled to the memory programmed with executable instructions, the instructions including a landfill interface for obtaining specific real-time data relating to landfill activity comprising at least one of storage liquid level, air compressor pressure, air compressor temperature, pump status data, pump current data, force main and air supply pressure data. An air compressors that is connected to a control valve is operable to regulate the amount of liquid within a landfill cell, gas well, tank or lift-station; and a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is consistent of landfill liquid levels, volumes, disposal volume and storage capacity, (c) displaying the analysis results as an alarm on the display, and (d) receiving instructions from the user to send a control signal to the control valve or pump to increase or decrease the amount of liquid within a landfill cell, gas well, tank or lift-station, based on a determination made by the user after reviewing the results of the analysis of the landfill activity data.

In certain illustrative embodiments, a method for remotely monitoring and controlling air compressors in a landfill facility for disposal of waste materials is also provided herein, comprising: an air compressor that is connected to control valve is operable to regulate the amount of liquid within a landfill cell, gas well, tank or lift-station; (a) obtaining, by at least one reader device located within the landfill facility, specific real-time data relating to landfill activity comprising at least one of storage liquid level, air compressor pressure, air compressor temperature, pump status data, pump current data, force main and air supply pressure data (b) comparing the obtained landfill activity real-time data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes, disposal volume and storage capacity, (d) displaying the analysis results as an alarm on a display for a user, and (e) receiving instructions from the user regarding automatically operating the control valve by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of liquid storage tanks activity in a landfill facility for disposal of waste materials is also provided herein, comprising: a memory, a display for viewing by a user, and a processor coupled to the memory programmed with executable instructions. The instructions including a landfill data interface for obtaining specific real-time data relating to landfill activity comprising at least one of liquid level, liquid flow, liquid volume, pump status data, pump current data, pump setpoints, force main and air supply pressure data. A liquid storage tank that is connected to a landfill pump station, gas well or lift station is operable to regulate the amount of liquid within a landfill cell, tank, gas well or lift-station; and a monitoring component for: (a) comparing the obtained landfill activity real-time data with pre-stored information from a database, and (b) analyzing the difference between the obtained landfill activity real-time data and the stored information to identify whether the landfill activity has surpassed a pre-set threshold value, wherein the pre-set threshold value is consistent of landfill liquid levels, volumes, disposal volume and storage capacity, (c) displaying the analysis results on the display, and (d) automatically sending a control signal to the storage level or pumps to increase or decrease the amount of liquid provided to disposal or storage based on the results of the analysis of the landfill activity real-time data.

In certain illustrative embodiments, a method for remotely monitoring and controlling liquid storage tanks activity in a landfill facility for disposal of waste materials is also provided herein, comprising: (a) a storage tank level or pumps that is connected to a landfill pump station, gas well or lift station is operable to regulate the amount of liquid within a landfill cell, tank, gas well or lift-station; obtaining, by at least one reader device located within the landfill facility, specific real-time data relating to landfill activity comprising at least one of liquid level, liquid flow, liquid volume, pump status data, pump current data, pump setpoints, force main and air supply pressure data; (b) comparing the obtained landfill activity data with pre-stored information from a database (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes, disposal volume and storage capacity, (d) automatically operating the storage tank level or pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of storage tanks activity in a landfill facility for disposal of waste materials is also provided herein, comprising of a memory, a display for viewing by a user and a processor coupled to the memory programmed with executable instructions. The instructions including a landfill interface for obtaining specific real-time data relating to landfill activity comprising at least one of liquid level, liquid flow, liquid volume, pump status data, pump current data, pump setpoints, force main and air supply pressure data. A storage tank level or pump that is connected to a landfill pump station, gas well or lift station is operable to regulate the amount of liquid within a landfill cell, gas well, tank or lift-station, a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is consistent of landfill liquid levels, volumes, disposal volume and storage capacity, (c) displaying the analysis results as an alarm on the display, and (d) receiving instructions from the user to send a control signal to the storage tank level or pump to increase or decrease the amount of liquid within a landfill cell, gas well, tank or lift-station, based on a determination made by the user after reviewing the results of the analysis of the landfill activity data.

In certain illustrative embodiments, a method for remotely monitoring and controlling storage tanks in a landfill facility for disposal of waste materials is also provided herein, comprising: (a) a storage tank level or pump that is connected to a landfill pump station, gas well or lift station is operable to regulate the amount of liquid within a landfill cell, gas well, tank or lift-station; (b) obtaining, by at least one reader device located within the landfill facility, specific real-time data relating to landfill activity comprising at least one of liquid level, liquid flow, liquid volume, pump status data, pump current data, pump setpoints, force main and air supply pressure data; (c) comparing the obtained landfill activity real-time data with pre-stored information from a database, (d) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes, disposal volume and storage capacity; (e) displaying the analysis results as an alarm on a display for a user, and (f) receiving instructions from the user regarding automatically operating the storage tank level or pump by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of condensate sumps activity in a landfill facility for disposal of waste materials is also provided herein, comprising of a memory, a display for viewing by a user, a processor coupled to the memory programmed with executable instructions. The instructions including a landfill data interface for obtaining specific real-time data relating to landfill activity comprising at least one of liquid level, liquid flow, liquid volume, pump status data, pump current data, pump setpoints, force main and air supply pressure data and pump pulses or strokes data. A condensate pump that is connected to a landfill sump, gas well or liquid storage tank is operable to regulate the amount of liquid within a landfill cell, tank, gas well or lift-station and a monitoring component for: (a) comparing the obtained landfill activity real-time data with pre-stored information from a database, and (b) analyzing the difference between the obtained landfill activity real-time data and the stored information to identify whether the landfill activity has surpassed a pre-set threshold value, wherein the pre-set threshold value is consistent of landfill liquid levels, volumes and storage capacity, and (c) displaying the analysis results on the display, and (d) automatically sending a control signal to the condensate pumps to increase or decrease the amount of liquid provided to disposal or storage based on the results of the analysis of the landfill activity real-time data.

In certain illustrative embodiments, a method for remotely monitoring and controlling condensate pump activity in a landfill facility for disposal of waste materials is also provided herein, comprising: (a) a condensate pump that is connected to a landfill sump, gas well or liquid storage tank is operable to regulate the amount of liquid within a landfill cell, tank, gas well or lift-station; obtaining, by at least one reader device located within the landfill facility, specific real-time data relating to landfill activity comprising at least one of liquid level, liquid flow, liquid volume, pump status data, pump current data, pump setpoints, force main and air supply pressure data and pump pulses or strokes data; (b) comparing the obtained landfill activity data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (d) automatically operating the condensate pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of condensate pumps activity in a landfill facility for disposal of waste materials is also provided herein, comprising of a memory, a display for viewing by a user, a processor coupled to the memory programmed with executable instructions. The instructions including a landfill interface for obtaining specific real-time data relating to landfill activity comprising at least one of liquid level, liquid flow, liquid volume, pump status data, pump current data, pump setpoints, force main and air supply pressure data and pump pulses or strokes data. A landfill pump that is connected to a landfill sump, gas well or liquid storage tank is operable to regulate the amount of liquid within a landfill cell, tank or lift-station; and a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is consistent of landfill liquid levels, volumes and storage capacity. (c) displaying the analysis results as an alarm on the display, and (d) receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling condensate pumps in a landfill facility for disposal of waste materials is also provided herein, comprising of a condensate pump that is connected to a landfill sump, gas well or liquid storage tank is operable to regulate the amount of liquid within a landfill cell, tank or lift-station; (a) obtaining, by at least one reader device located within the landfill facility, specific real-time data relating to landfill activity comprising at least one of liquid level, liquid flow, liquid volume, pump status data, pump current data, pump setpoints, force main pressure data and pump runtime data; (b) comparing the obtained landfill activity real-time data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (d) displaying the analysis results as an alarm on a display for a user, and (e) receiving instructions from the user regarding automatically operating the condensate pumps by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of pump station activity in a landfill facility for disposal of waste materials is also provided herein, comprising of a memory, a display for viewing by a user, a processor coupled to the memory programmed with executable instructions. The instructions including a landfill data interface for obtaining specific real-time data relating to landfill activity comprising at least one of liquid level, liquid flow, liquid volume, pump status data, pump current data, pump setpoints, force main and air supply pressure data and pump pulses or strokes data. A landfill pump that is connected to a landfill sump, gas well or liquid storage tank is operable to regulate the amount of liquid within a landfill cell, tank, gas well or lift-station; and a monitoring component for: (a) comparing the obtained landfill activity real-time data with pre-stored information from a database, and (b) analyzing the difference between the obtained landfill activity real-time data and the stored information to identify whether the landfill activity has surpassed a pre-set threshold value, wherein the pre-set threshold value is consistent of landfill liquid levels, volumes and storage capacity, (c) displaying the analysis results on the display, and (d) automatically sending a control signal to the landfill pumps to increase or decrease the amount of liquid provided to disposal or storage based on the results of the analysis of the landfill activity real-time data.

In certain illustrative embodiments, a method for remotely monitoring and controlling liquid pump stations activity in a landfill facility for disposal of waste materials is also provided herein, comprising of: (a) a landfill pump that is connected to a landfill sump, gas well or liquid storage tank is operable to regulate the amount of liquid within a landfill cell, tank, gas well or lift-station; obtaining, by at least one reader device located within the landfill facility, specific real-time data relating to landfill activity comprising at least one of liquid level, liquid flow, liquid volume, pump status data, pump current data, pump setpoints, force main and air supply pressure data and pump pulses or strokes data; (b) comparing the obtained landfill activity data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (d) automatically operating the landfill pumps, by the processor sending a control signal to the pumps to increase or decrease the amount of liquid within a landfill cell, gas wells, tank or lift-station; based on the results of the analysis of the landfill activity data.

In certain illustrative embodiments, a system for remote monitoring and control of liquid pump stations activity in a landfill facility for disposal of waste materials is also provided herein, comprising of a memory, a display for viewing by a user and a processor coupled to the memory programmed with executable instructions. The instructions including a landfill interface for obtaining specific real-time data relating to landfill activity comprising at least one of liquid level, liquid flow, liquid volume, pump status data, pump current data, pump setpoints, force main and air supply pressure data and pump pulses or strokes data. A landfill pump that is connected to a landfill sump, gas well or liquid storage tank is operable to regulate the amount of liquid within a landfill cell, tank or lift-station; and a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is consistent of landfill liquid levels, volumes and storage capacity, (c) displaying the analysis results as an alarm on the display, and (d) receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling liquid pump stations in a landfill facility for disposal of waste materials is also provided herein, comprising of a landfill pump that is connected to a landfill sump, gas well or liquid storage tank is operable to regulate the amount of liquid within a landfill cell, tank or lift-station; (a) obtaining, by at least one reader device located within the landfill facility, specific real-time data relating to landfill activity comprising at least one of liquid level, liquid flow, liquid volume, pump status data, pump current data, pump setpoints, force main pressure data and pump runtime; (b) comparing the obtained landfill activity real-time data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (d) displaying the analysis results as an alarm on a display for a user, and (e) receiving instructions from the user regarding automatically operating the landfill pumps by sending a control signal to the flare control valve to increase or decrease the amount of liquid within a landfill cell, gas wells, tank or lift-station, based on a determination made by the user after reviewing the results of the analysis of the landfill activity data.

In certain illustrative embodiments, a system for remote monitoring and control of pump station activity in a landfill facility for disposal of waste materials is also provided herein, comprising of a memory, a display for viewing by a user, a processor coupled to the memory programmed with executable instructions. The instructions including a landfill data interface for obtaining specific real-time data relating to landfill activity comprising at least one of liquid level, liquid flow, liquid volume, pump status data, pump current data, pump setpoints, force main pressure data and pump runtime data. A landfill pump that is connected to a landfill sump or liquid storage tank is operable to regulate the amount of liquid within a landfill cell, tank or lift-station; and a monitoring component for: (a) comparing the obtained landfill activity real-time data with pre-stored information from a database, and (b) analyzing the difference between the obtained landfill activity real-time data and the stored information to identify whether the landfill activity has surpassed a pre-set threshold value, wherein the pre-set threshold value is consistent of landfill liquid levels, volumes and storage capacity, (c) displaying the analysis results on the display, and (d) automatically sending a control signal to the landfill pumps to increase or decrease the amount of liquid provided to disposal or storage based on the results of the analysis of the landfill activity real-time data.

In certain illustrative embodiments, a method for remotely monitoring and controlling liquid pump stations activity in a landfill facility for disposal of waste materials is also provided herein, comprising: (a) a landfill pump that is connected to a landfill sump or liquid storage tank is operable to regulate the amount of liquid within a landfill cell, tank or lift-station; (b) obtaining, by at least one reader device located within the landfill facility, specific real-time data relating to landfill activity comprising at least one of liquid level, liquid flow, liquid volume, pump status data, pump current data, pump setpoints, force main pressure data and pump runtime data, (c) comparing the obtained landfill activity data with pre-stored information from a database, (d) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (e) automatically operating the landfill pumps, by the processor sending a control signal to the pumps to increase or decrease the amount of liquid within a landfill cell, tank or lift-station; based on the results of the analysis of the landfill activity data.

In certain illustrative embodiments, a system for remote monitoring and control of liquid pump stations activity in a landfill facility for disposal of waste materials is also provided herein, comprising of a memory, a display for viewing by a user and a processor coupled to the memory programmed with executable instructions. The instructions including a landfill interface for obtaining specific real-time data relating to landfill activity comprising at least one of liquid level, liquid flow, liquid volume, pump status data, pump current data, pump setpoints, force main pressure data and pump runtime data, A landfill pump that is connected to a landfill sump or liquid storage tank is operable to regulate the amount of liquid within a landfill cell, tank or lift-station and a monitoring component for: (a) comparing the obtained landfill activity real-time data with pre-stored information from a database, and (b) analyzing the difference between the obtained landfill activity real-time data and the pre-stored information to identify whether the landfill activity has surpassed a pre-set threshold value, wherein the pre-set threshold value is consistent of landfill liquid levels, volumes and storage capacity, (c) displaying the analysis results as an alarm on the display, and (d) receiving instructions from the user to send a control signal to the landfill pumps to increase or decrease the amount of liquid within a landfill cell, tank or lift-station, based on a determination made by the user after reviewing the results of the analysis of the landfill activity data.

In certain illustrative embodiments, a method for remotely monitoring and controlling liquid pump stations in a landfill facility for disposal of waste materials is also provided herein, comprising of a landfill pump that is connected to a landfill sump or liquid storage tank is operable to regulate the amount of liquid within a landfill cell, tank or lift-station, which (a) obtaining, by at least one reader device located within the landfill facility, specific real-time data relating to landfill activity comprising at least one of liquid level, liquid flow, liquid volume, pump status data, pump current data, pump setpoints, force main pressure data and pump runtime data, (b) comparing the obtained landfill activity real-time data with pre-stored information from a database, (c) analyzing, by a processor, the difference between the obtained landfill activity real-time data and the pre-stored information to identify whether the landfill activity has surpassed a pre-set threshold value, wherein the pre-set threshold value is consistent of landfill liquid levels, volumes and storage capacity, (d) displaying the analysis results as an alarm on a display for a user, and (e) receiving instructions from the user regarding automatically operating the landfill pumps by sending a control signal to the flare control valve to increase or decrease the amount of liquid within a landfill cell, tank or lift-station, based on a determination made by the user after reviewing the results of the analysis of the landfill activity data.

In certain illustrative embodiments, the system and method can collect real time data relating to multiples of, e.g., at least two of, or at least three of, or at least four of, the identified criteria for the systems and methods described herein.

In certain illustrative embodiments, a system and method for industrial process control is provided, and in particular, a system and method for remote monitoring and control of landfill and recycling operations. The system and method can provide an intelligent platform/portal for remote, real-time industrial data gathering and process control for management of landfill and recycling operations such as leachate, gas, water and other liquids, so that the facility can be controlled by a remote off-site user. The system and method can directly upload data from the landfill site (such as liquid volumes, flows, level, equipment runtime, sorter data, status, etc) onto a centralized platform or portal, and the landfill wastewater and flare equipment can connected to the platform (e.g. a SCADA platform) to allow remote control of said equipment. The platform can automatically monitor the status of the landfill equipment and can allow to user to make adjustments to setpoints, etc. remotely, thus providing remote web-based operations of landfill environmental operational technology. The remotely controlled operations can include: one or more of: remote control of the on/off setpoints for the pumps at a pumping location; remote control of the resetting alarms or alerts; collection of pump motor runtime and amount of pump starts; providing the remote users the option to adjust pumping levels and enable or disable alarms without the need for any type of programming; and providing the remote users the ability to adjust alarm thresholds thus giving each alarm a pipeline action. For example, the remote monitoring and controlling of flare activity in the landfill facility for disposal of waste materials can include: causing flare gas from the landfill facility to engage a flare control valve or blower speed that is automatically operable and capable of supplying flare gas to the flare; obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint; comparing the obtained landfill activity data with pre-stored information from a database; analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature; and automatically operating the flare control valve or blower speed by the processor sending a control signal to the flare control valve to increase or decrease the amount of flare gas supplied to the flare, based on the results of the analysis of the landfill activity data. In certain illustrative embodiments, a human user can also be involved in analyzing the data and/or adjusting any of the data points via remote monitoring/control on a portal or other electronic platform.

In the illustrative embodiments described herein, the comparing, analyzing and/or determining step can incorporate data and information relating to the landfill or recycling facility and its equipment, functionality and operations, or collected from one or more sensors located on the various items of equipment. More specifically, the comparing, analyzing and/or determining steps can include various determinations relating to landfill or recycling options that are useful to the site owner. In certain illustrative embodiments, the comparing, analyzing and/or determinations can be made or facilitated using data science to leverage existing internal and external data sources and blend various algorithms and machine learning functionality to discern hidden patterns and extract actionable insights from the raw data.

In the illustrative embodiments described herein, the system can include one or more data sources and a computer linked to a central server. Data sources may be, for example, devices configured for capturing and communicating operational data indicative of one or more operational characteristics of landfill or recycling equipment. Data sources are configured to communicate with central server by sending and receiving operational data over a network (e.g., the Internet, an Intranet, or other suitable network) and/or via hard wiring.

Central server may be configured to process and evaluate operational data received from data sources in accordance with user input received via for example, a user interface such as the display provided on a local or remote computer or cellular or other phone or communications device, e.g., an electronic viewing portal. In certain illustrative embodiments, the communication between communications device and computer may be provided on a real-time basis. Alternatively, communication device may be configured to temporarily store or cache data and transfer the data to the central server at some later time In certain illustrative embodiments, the computer may include a processor and software that communicates with one or more memory storage areas. Memory storage areas can be, for example, multiple data repositories which stores pre-recorded data pertaining to landfill or recycling related information. Database for data storage can be in memory storage area and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system or cloud computing systems or edge computing systems or internet of things. Rather, the server and computing system described herein may refer to any combination of devices or entities adapted to perform the computing and networking functions, operations, and/or processes described herein without departing from the spirit and scope of embodiments of the present invention While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

What is claimed is:

1. A method for remotely monitoring and controlling flare activity in a landfill facility for disposal of waste materials, comprising:
    (a) causing flare gas from the landfill facility to engage a flare control valve or blower speed that is automatically operable and capable of supplying flare gas to the flare,
    (b) obtaining, by at least one reader device located within the landfill facility, specific real-time data relating to landfill activity comprising at least one of temperature data, gas pressure data, gas vacuum data, gas flow data, blower motor current, vacuum target setpoint and gas flow target setpoint,
    (c) comparing the obtained landfill activity data with pre-stored information from a database,
    (d) analyzing, by a processor, the difference between the obtained landfill activity real-time data and the pre-stored information to identify whether the landfill activity has surpassed a pre-set threshold value, wherein the pre-set threshold value is based on one or more of gas pressure/vacuum, gas flow, and flare temperature, and
    (e) automatically operating the flare control valve or blower speed by the processor sending a control signal to the flare control valve to increase or decrease the amount of flare gas supplied to the flare, based on the results of the analysis of the landfill activity data.

2. The method of claim 1, wherein the landfill data interface obtains specific real-time data relating to landfill activity comprising more than one of temperature data, gas pressure data, gas vacuum data, gas flow data, blower motor current, vacuum target setpoint and gas flow target setpoint.

\* \* \* \* \*